US010257738B2

(12) United States Patent
Wiberg et al.

(10) Patent No.: US 10,257,738 B2
(45) Date of Patent: Apr. 9, 2019

(54) RESOLUTION OF BEAM AND NODE IDENTITIES FOR DUAL CONNECTIVITY

(71) Applicant: TELEFONAKTIEBOLAGET LM ERICSSON (PUBL), Stockholm (SE)

(72) Inventors: Niclas Wiberg, Linköping (SE); Andreas Bergström, Vikingstad (SE); Håkan Andersson, Linköping (SE); Qiang Zhang, Täby (SE); Johan Furuskog, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/548,190

(22) PCT Filed: Feb. 26, 2016

(86) PCT No.: PCT/IB2016/051088
§ 371 (c)(1),
(2) Date: Aug. 2, 2017

(87) PCT Pub. No.: WO2017/068432
PCT Pub. Date: Apr. 27, 2017

(65) Prior Publication Data
US 2018/0049055 A1    Feb. 15, 2018

Related U.S. Application Data

(60) Provisional application No. 62/244,876, filed on Oct. 22, 2015.

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0695* (2013.01); *H04W 72/044* (2013.01);
(Continued)

(58) Field of Classification Search
CPC . H04W 24/10; H04W 72/044; H04W 72/085; H04W 76/15; H04W 88/08; H04W 88/06; H04B 7/0695
See application file for complete search history.

(56) References Cited

U.S. PATENT DOCUMENTS

2015/0264699 A1    9/2015  Fwu
2017/0034812 A1*   2/2017  Deng ................. H04W 72/046
(Continued)

FOREIGN PATENT DOCUMENTS

WO    2014/172306 A2    10/2014
WO    2015/115376 A1    8/2015

OTHER PUBLICATIONS

3GPP TS 36.213, "LTE; Evolved Universal Terrestrial Radio Access (E-UTRA); Physical layer procedures," version 11; Oct. 2012.
(Continued)

*Primary Examiner* — Jae Y Lee

(57) ABSTRACT

Systems and methods relating to the use of Beam Reference Symbols (BRSs) and BRS Received Power (BRS-RP) reporting for the selection of a beam for transmission to a wireless device from a first Radio Access Network (RAN) operating according to a first Radio-Access Technology (RAT) in a dual connectivity scenario in which control signaling (e.g., BRS-RP reporting) from the wireless device to the first RAN of the first RAT is transmitted via a second RAN of a second RAT. In particular, embodiments are disclosed for resolving timing and/or node ambiguity with respect to BRS-RP reporting.

14 Claims, 18 Drawing Sheets

(51) Int. Cl.
  *H04W 72/04*   (2009.01)
  *H04W 72/08*   (2009.01)
  H04W 88/06    (2009.01)
  H04W 88/08    (2009.01)
  H04W 76/15    (2018.01)
(52) U.S. Cl.
  CPC .......... *H04W 72/085* (2013.01); *H04W 76/15* (2018.02); *H04W 88/06* (2013.01); *H04W 88/08* (2013.01)

(56) References Cited

U.S. PATENT DOCUMENTS

2017/0111094 A1* 4/2017 Sartori ................. H04B 7/0617
2017/0374703 A1* 12/2017 Sang ....................... H04W 8/18

OTHER PUBLICATIONS

3GPP TS 36.211, "LTE; Evolved Universal Terrestrial Radio Access (E-UTRA); Physical channels and modulation," version 11; Oct. 2012.
3GPP TS 36.331, "LTE; Evolved Universal Terrestrial Radio Access (E-UTRA); Radio Resource Control (RRC) Protocol Specification;" Nov. 2012.

* cited by examiner

RESOLUTION OF BEAM AND NODE IDENTITIES FOR DUAL CONNECTIVITY

RELATED APPLICATIONS

This application is a National Phase Entry of PCT/IB2016/051088, filed Feb. 26, 2016, which claims the benefit of provisional patent application Ser. No. 62/244,876, filed Oct. 22, 2015, the disclosures of which are incorporated herein by reference in their entirety.

TECHNICAL FIELD

The present disclosure relates to a Radio Access Technology (RAT) that utilizes Transmit (Tx)-beamforming to transmit signals and, in particular, to determining a best beam for transmission.

BACKGROUND

Beam Reference Signals

In a Radio Access Technology (RAT), such as a new Fifth Generation (5G) RAT, which may utilize or even rely on Transmit (Tx)-beamforming to transmit signals from a radio network node to a User Equipment device (UE), there is a mechanism to identify "good" beams for a given UE. As an example, FIG. 1 illustrates a radio network node (e.g., a base station) 10 that utilizes Tx-beamforming to transmit multiple downlink beams. Typically, radio network nodes transmit beamformed reference signals, referred to as Beam Reference Symbols (BRSs), comprising a sequence that enables the UE to measure the BRS Received Power (BRS-RP) on different beams transmitted from the same or different radio access nodes.

A basic scenario is that certain subframes are reserved for BRS transmissions and the radio network node "sweeps" through all available Tx-beams as often as feasible. The time it takes to cycle through all beams depends on the time-frequency resources set aside for the task.

As an example, suppose that a BRS requires p Physical Resource Blocks (PRBs) in the frequency domain and the duration of one Orthogonal Frequency-Division Multiplexing (OFDM) symbol to be transmitted in the time domain. Further suppose that the radio network node transmitter can change Tx-beam direction between every OFDM symbol. FIG. 2 illustrates one BRS allocation in the time/frequency grid during four subframes placed m subframes apart. The numbers in FIG. 2 refer to Tx-beam identities. FIG. 2 depicts an example where four regions with a width of p PRBs each have been reserved in the frequency domain for BRS transmission.

However, in a basic system only one frequency region is present, denoted by k=0 in FIG. 2. By transmitting one BRS in each OFDM symbol and changing the Tx-beam between each symbol, the radio network node thus transmits 14 beams in one subframe, say subframe n. The UE may receive basic timing information already from the BRS. For example, the BRS sequence may be different in each OFDM symbol enabling the UE to obtain subframe timing. The BRS sequences used in each subframe within one radio frame may also be different. For example, the subframe n uses one set of BRS sequences and subframe n+m uses another set of BRS sequences which enables the UE to obtain the radio frame timing. The UE can then deduce the exact subframe number within a radio frame from the received BRS sequence. Typically, the total number of available Tx-beams is larger than 14, say for example 28 or 56, in total. However, with the described procedure of providing basic time information using the BRS, the time scale of that information will be limited by the number of available BRS sequences and to support longer time scales signaling the radio frame timing is required.

To provide the UE with radio frame timing, the radio frame number, also known as the System Frame Number (SFN), may be broadcasted. However, broadcasting the SFN may not be feasible in a beam-based system. It may be very expensive to broadcast information in beam-based systems since this information would have to be included in all possible beams.

After transmitting BRS using 14 beams in subframe n, the network then continues to transmit BRS using 14 new beams in the next subframe designated for BRS transmissions, say subframe n+m. The UE may need to measure several BRS subframes to cover all beams in the system. It is possible that the same BRS frequency resource k, OFDM symbol, and BRS sequence is used to transmit several different beams during multiple subframes. Note that the information represented by the beam numbering in FIG. 2 is not given by the BRS, but is only known at the radio network node and depends on the implementation. This presents no ambiguity as long as the BRS subframes are further apart in time (the value of m) than the time required for the UE to measure the BRS-RP of each beam and report (a subset of) those back to the network or if this time is well-known by the network. Based on this timing, the network is informed about which of the Tx-beams with which the reported BRS-RP values are associated.

A reason for reusing the BRS sequences between subframes is that there is a limited set of available sequences with good properties. For the UE to distinguish between different radio network nodes, a different set of 14 sequences is used for neighboring nodes. As an example, one could use the Secondary Synchronization Signal (SSS) sequences from Long-Term Evolution (LTE) Release 8. There are a total of 168 such sequences available. With each node using 14 sequences, it is possible to assign different sequence sets to 168/14=12 nodes and still maintain uniqueness. Call these different sets BRS groups.

Note that other sequences than the SSS can be used for BRS, e.g., newly designed signals with features that make them easy to detect for the UE. Also note that the number of sequences transmitted in a BRS subframe may be less than 14. For example, in the case of truncated downlink subframes (which are common in Time-Division Duplexing (TDD) systems), only 12 or 13 BRSs may be possible to fit. Depending on the total number of BRS sequences and the number used in each subframe, the number of BRS groups can obviously be something other than 12, as given above.

To keep the "sweep time," i.e., the time it takes to transmit all available beams from the radio network node, several BRS/beams can be frequency-multiplexed. See FIG. 3 for an illustration where there are four frequency resources assigned and denoted by k={0, 1, 2, 3}. The number of frequency-domain resources reserved for BRS is a compromise between achieving a short sweep time by transmitting several beams in each OFDM symbol and the amount of PRBs that are used for the BRS, thus not being available for Physical Downlink Shared Channel (PDSCH). In a radio network node that utilizes wideband beamforming, such as analog beamforming, the number of available antenna ports, i.e. beam directions, is also a restriction. Only a limited number of antenna ports are typically used for BRS while some are reserved for PDSCH transmission.

FIG. 3 illustrates several possible BRS transmission scenarios. For instance, if all four BRS-resources are utilized then all 56 beams are transmitted in subframe n. This means that only one BRS subframe has to be observed by the UE to measure all BRS-RP values. However, it is typically advantageous to transmit, and measure, each beam on two orthogonal polarizations, e.g., +45° and −45°. If in FIG. 3 the BRS allocations denoted by k=0 and 2 correspond to +45° polarizations while k=1 and 3 correspond to −45° polarizations, then two consecutive subframes with BRS will yield an opportunity to measure all beams in both polarizations. In this situation the "sweep time" is m subframes.

As a further example, in a system with a more limited number of antenna ports (i.e., beams) for BRS, only the frequency resources denoted by k=0 and 1 are available. In this case, four consecutive BRS subframes are required to present the opportunity to measure all beams on both polarizations.

Dual Connectivity Between LTE RAT and a New 5G RAT

When a new 5G RAT is first deployed, a feasible scenario is that this is done in dual-connectivity mode with an LTE system. The new RAT is used as a data-rate booster while the control signaling goes on top of the LTE network. In such a scenario, the absolute timing between control-signaling messages over the LTE network and radio frames in the new RAT network may not be controllable or known by the new RAT network depending on the level of integration.

Thus, there is a need for systems and methods for enabling the use of BRS and BRS-RP reporting for the selection of the "best" beam for a UE in a dual-connectivity scenario in which control signaling from the UE to the new RAT is transmitted via a legacy network, such as an LTE network.

SUMMARY

Systems and methods relating to the use of Beam Reference Symbols (BRSs) and BRS Received Power (BRS-RP) reporting for the selection of a beam for transmission to a wireless device from a first Radio Access Network (RAN) operating according to a first Radio Access Technology (RAT) in a dual-connectivity scenario in which control signaling (e.g., BRS-RP reporting) from the wireless device to the first RAN of the first RAT is transmitted via a second RAN of a second RAT. In particular, embodiments are disclosed for resolving timing and/or node ambiguity with respect to BRS-RP reporting.

In some embodiments, a method of operation of a base station of a first RAN of a cellular communications system, where the base station utilizes beamforming to transmit a plurality of beams, comprises identifying, based on a BRS-RP report received from a wireless device via a second base station of a second RAN of the cellular communications system, a time-frequency resource that corresponds to a best BRS-RP measurement value from among one or more BRS-RP measurement values reported by the wireless device in the BRS-RP report. Due to timing ambiguity, the identified time-frequency resource maps, via a predefined BRS pattern, to two or more beams in two or more subframes. The method further comprises transmitting messages comprising timing information on the two or more beams and receiving a second BRS-RP report from the wireless device, where the second BRS-RP report comprises one or more BRS-RP measurement values for one or more time-frequency resources and corresponding timing information for the BRS-RP measurements that is based on the timing information comprised in one of the messages transmitted on the two or more beams that was received by the wireless device. The method further comprises determining, based on the second BRS-RP report and the timing information comprised in the second BRS-RP report, that a beam that corresponds to a best BRS-RP measurement value reported by the wireless device in the second BRS-RP report is a best beam for transmission from the base station to the wireless device.

In some embodiments, the second RAN operates according to a different RAT than the first RAN.

In some embodiments, the first RAN is a Fifth Generation (5G) RAN, and the second RAN is a Long-Term Evolution (LTE) RAN.

In some embodiments, the method further comprises transmitting subsequent messages scheduling downlink or uplink transmission for the wireless device on the beam that corresponds to the best BRS-RP measurement value reported by the wireless device in the second BRS-RP report.

In some embodiments, the timing information comprises a current System Frame Number (SFN) of the base station.

In some embodiments, the identified time-frequency resource is a particular symbol position in the time domain.

In some embodiments, the identified time-frequency resource is a particular symbol position in the time domain within a particular group of Physical Resource Blocks (PRBs) in the frequency domain.

In some embodiments, the method further comprises forwarding the BRS-RP report to one or more additional base stations of the first RAN, the one or more additional base stations being base stations that are assigned to the same BRS group as the first base station. Transmitting the messages comprises transmitting the messages comprising the timing information and a node identifier of the base station on the two or more beams, where respective messages are also transmitted by each of the one or more additional base stations. Receiving the second BRS-RP report comprises receiving the second BRS-RP report from the wireless device, the second BRS-RP report comprising: (a) the one or more BRS-RP measurement values for the one or more time-frequency resources and the corresponding timing information for the BRS-RP measurements that is based on the timing information comprised in the one of the messages transmitted on the two or more beams that was received by the wireless device and (b) the node identifier comprised in the one of the messages transmitted on the two or more beams that was received by the wireless device.

Further, in some embodiments, determining the beam that corresponds to the best BRS-RP measurement value reported by the wireless device in the second BRS-RP report comprises, if the second BRS-RP report comprises the node identifier of the base station, determining, based on the second BRS-RP report, that the beam that corresponds to the best BRS-RP measurement value reported by the wireless device in the second BRS-RP report is the best beam for transmission to the wireless device.

In some embodiments, a base station of a first RAN of a cellular communications system, the base station utilizing beamforming to transmit a plurality of beams, comprises a network interface, a transceiver, a node processor comprising one or more processing circuits, and memory storing instructions executable by the node processor whereby the base station is adapted to perform any of the aforementioned embodiments of the method of operation of the base station.

Embodiments of a computer program are disclosed in which the computer program comprises instructions which, when executed on at least one processor, cause the at least one processor to carry out the method according to any of the embodiments of the method of operation of the base station described above. In some embodiments, a carrier containing the computer program are disclosed, wherein the carrier is one of an electronic signal, an optical signal, a radio signal, or a computer-readable storage medium.

In some embodiments, a base station of a first RAN of a cellular communications system, the base station utilizing beamforming to transmit a plurality of beams, comprises: means for identifying, based on a BRS-RP report received from a wireless device via a second base station of a second RAN of the cellular communications system, a time-frequency resource that corresponds to a best BRS-RP measurement value from among one or more BRS-RP measurement values reported by the wireless device in the BRS-RP report. The identified time-frequency resource maps, via a predefined BRS pattern, to two or more beams in two or more subframes. The base station further comprises means for transmitting messages comprising timing information on the two or more beams and means for receiving a second BRS-RP report from the wireless device, where the second BRS-RP report comprises one or more BRS-RP measurement values for one or more time-frequency resources and corresponding timing information for the BRS-RP measurements that is based on the timing information comprised in one of the messages transmitted on the two or more beams that was received by the wireless device. The base station further comprises means for determining, based on the second BRS-RP report and the timing information comprised in the second BRS-RP report, that a beam that corresponds to the best BRS-RP measurement value reported by the wireless device in the second BRS-RP report is a best beam for transmission from the base station to the wireless device.

In some embodiments, a base station of a first RAN of a cellular communications system, the base station utilizing beamforming to transmit a plurality of beams, comprises an identification module operable to identify, based on a BRS-RP report received from a wireless device via a second base station of a second RAN of the cellular communications system, a time-frequency resource that corresponds to a best BRS-RP measurement value from among one or more BRS-RP measurement values reported by the wireless device in the BRS-RP report. The identified time-frequency resource maps, via a predefined BRS pattern, to two or more beams in two or more subframes. The base station further comprises a message transmission module operable to transmit messages comprising timing information on the two or more beams and a report module operable to receive a second BRS-RP report from the wireless device, where the second BRS-RP comprises one or more BRS-RP measurement values for one or more time-frequency resources and corresponding timing information for the BRS-RP measurements that is based on the timing information comprised in one of the messages transmitted on the two or more beams that was received by the wireless device. The base station further comprises a determining module operable to determine, based on the second BRS-RP report and the timing information comprised in the second BRS-RP report, that a beam that corresponds to the best BRS-RP measurement value reported by the wireless device in the second BRS-RP report is a best beam for transmission from the base station to the wireless device.

In some embodiments, a method of operation of a base station of a first RAN of a cellular communications system, the base station utilizing beamforming to transmit a plurality of beams, comprises identifying, based on a BRS-RP report received from a wireless device via a second base station of a second RAN of the cellular communications system, a time-frequency resource that corresponds to a best BRS-RP measurement value from among one or more BRS-RP measurement values reported by the wireless device in the BRS-RP report. The identified time-frequency resource maps to one of a plurality of beams in a predefined BRS pattern. The method further comprises transmitting a message comprising a node identifier of the base station on the one of the plurality of beams, where respective messages are also transmitted by one or more additional base stations that are assigned to the same BRS group as the first base station. The method further comprises receiving a second BRS-RP report comprising a node identifier from the wireless device, the node identifier comprised in the second BRS-RP report being the node identifier comprised in one of the messages transmitted by the base station and the one or more additional base stations. The method further comprises determining, based on the second BRS-RP report and the node identifier comprised in the second BRS-RP report, that a beam that corresponds to a best BRS-RP measurement value comprised in the second BRS-RP report is a best beam for transmission to the wireless device and that the one of the base station and the one or more additional base stations that corresponds to the node identifier comprised in the second BRS-RP report is a best base station for transmission of the best beam to the wireless device.

In some embodiments, the method further comprises forwarding the BRS-RP report to the one or more additional base stations.

In some embodiments, the second RAN operates according to a different RAT than the first RAN.

In some embodiments, the first RAN is a 5G RAN, and the second RAN is a Long-Term Evolution (LTE) RAN.

In some embodiments, the method further comprises, if the node identifier comprised in the second BRS-RP report corresponds to the base station, transmitting, by the base station, subsequent messages scheduling downlink or uplink transmission for the wireless device on the best beam determined for transmission to the wireless device.

In some embodiments, a base station of a first RAN of a cellular communications system, the base station utilizing beamforming to transmit a plurality of beams, comprises a network interface, a transceiver, a node processor comprising one or more processing circuits, and memory storing instructions executable by the node processor whereby the base station is adapted to perform any of the methods of operation of the base station described above.

Embodiments of a computer program are disclosed in which the computer program comprises instructions which, when executed on at least one processor, cause the at least one processor to carry out the method according to any of the embodiments of the method of operation of the base station described above. In some embodiments, a carrier containing the computer program are disclosed, wherein the carrier is one of an electronic signal, an optical signal, a radio signal, or a computer-readable storage medium.

In some embodiments, a base station of a first RAN of a cellular communications system, the base station utilizing beamforming to transmit a plurality of beams, comprises means identifying, based on a BRS-RP report received from a wireless device via a second base station of a second RAN of the cellular communications system, a time-frequency resource that corresponds to a best BRS-RP measurement value from among one or more BRS-RP measurement values reported by the wireless device in the BRS-RP report, where the identified time-frequency resource maps to one of the plurality of beams in a predefined BRS pattern. The base station further comprises means for transmitting a message comprising a node identifier of the base station on the one of the plurality of beams, where respective messages are also transmitted by one or more additional base stations that are assigned to the same BRS group as the first base station. The base station further comprises means for receiving a second BRS-RP report comprising a node identifier from the wireless device, the node identifier comprised in the second BRS-RP report being the node identifier comprised in one of the messages transmitted by the base station and the one or more additional base stations. The base station further comprises means for determining, based on the second BRS-RP report and the node identifier comprised in the second BRS-RP report, that a beam that corresponds to a best BRS-RP measurement value comprised in the second BRS-RP report is a best beam for transmission to the wireless device and that the one of the base station and the one or more additional base stations that corresponds to the node identifier comprised in the second BRS-RP report is a best base station for transmission of the best beam to the wireless device.

In some embodiments, a base station of a first RAN of a cellular communications system, the base station utilizing beamforming to transmit a plurality of beams, comprises an identification module operable to identify, based on a BRS-RP report, a time-frequency resource that corresponds to a best BRS-RP measurement value from among one or more BRS-RP measurement values reported by the wireless device in the BRS-RP report, where the identified time-frequency resource maps to one of the plurality of beams in the predefined BRS pattern. The base station further comprises a message transmission module operable to transmit a message comprising a node identifier of the base station on the one of the plurality of beams, where respective messages are also transmitted by one or more additional base stations that are assigned to the same BRS group as the first base station. The base station further comprises a report reception module operable to receive a second BRS-RP report comprising a node identifier from the wireless device, the node identifier comprised in the second BRS-RP report being the node identifier comprised in one of the messages transmitted by the base station and the one or more additional base stations. The base station further comprises a determining module operable to determine, based on the second BRS-RP report and the node identifier comprised in the second BRS-RP report, that a beam that corresponds to a best BRS-RP measurement value comprised in the second BRS-RP report is a best beam for transmission to the wireless device and that the one of the base station and the one or more additional base stations that corresponds to the node identifier comprised in the second BRS-RP report is a best base station for transmission of the best beam to the wireless device.

In some embodiments, a method of operation of a wireless device in a cellular communications system comprises receiving one or more subframes for a first RAN, the one or more subframes containing BRSs in a predefined BRS pattern and performing BRS-RP measurements, using the BRSs, on time-frequency resources assigned to a plurality of beams via the predefined BRS pattern. The predefined BRS pattern is such that, for a time-frequency resource, BRSs for different beams are transmitted on the time-frequency resource in different subframes. The method further comprises sending a BRS-RP report to a first base station of the first RAN via a second base station of a second RAN, the BRS-RP report comprising BRS-RP measurement values for at least some of the time-frequency resources assigned to the BRSs. The method further comprises receiving, from the first RAN, a message comprising timing information for the first base station and/or a node identifier of a base station from which the message was transmitted. The method further comprises sending a second BRS-RP report comprising one or more second BRS-RP measurement values and (a) timing information for the one or more second BRS-measurement values that is based on the timing information for the first base station and/or (b) the node identifier of the base station from which the message was transmitted.

In some embodiments, receiving the message comprises receiving, from the first base station of the first RAN, the message comprising the timing information for the first base station, and sending the second BRS-RP report comprises sending the second BRS-RP report comprising the one or more second BRS-RP measurement values and timing information for the one or more second BRS-RP measurement values that is based on the timing information for the first base station.

In some embodiments, receiving the message comprises receiving, from the first RAN, the message comprising the node identifier of the base station from which the message was transmitted, and sending the second BRS-RP report comprises sending the second BRS-RP report comprising the one or more second BRS-RP measurement values and the node identifier of the base station from which the message was transmitted.

In some embodiments, a wireless device enabled to operate in a cellular communications system, comprises a transceiver, a processor comprising one or more processing circuits, and memory storing instructions executable by the processor whereby the wireless device is adapted to perform any of the embodiments of the method of operation of the wireless device described above.

Embodiments of a computer program are disclosed in which the computer program comprises instructions which, when executed on at least one processor, cause the at least one processor to carry out the method according to any of the embodiments of the method of operation of the wireless device described above. In some embodiments, a carrier containing the computer program are disclosed, wherein the carrier is one of an electronic signal, an optical signal, a radio signal, or a computer-readable storage medium.

In some embodiments, a wireless device enabled to operate in a cellular communications system comprises means for receiving one or more subframes for a first RAN, the one or more subframes containing BRSs in a predefined BRS pattern and performing BRS-RP measurements, using the BRSs, on time-frequency resources assigned to a plurality of beams via the predefined BRS pattern. The predefined BRS pattern being such that, for a time-frequency resource, BRSs for different beams are transmitted on the time-frequency resource in different subframes. The wireless device further comprises means for sending a BRS-RP report to a first base station of the first RAN via a second base station of a second RAN, the BRS-RP report comprising BRS-RP measurement values for at least some of the time-frequency resources assigned to the BRSs. The wireless device further comprises means for receiving, from the first RAN, a message comprising timing information for the first base station and/or a node identifier of a base station from which the message was transmitted. The wireless device further comprises means for sending, via the second base station of the second RAN, a second BRS-RP report comprising one or more second BRS-RP measurement values and (a) timing information for the one or more second BRS measurement values that is based on the timing information for the first base station and/or (b) the node identifier of the base station from which the message was transmitted.

In some embodiments, a wireless device enabled to operate in a cellular communications system comprises a measurement module operable to receive one or more subframes for a first RAN, the one or more subframes containing BRSs in a predefined BRS pattern and perform BRS-RP measurements, using the BRSs, on time-frequency resources assigned to a plurality of beams via the predefined BRS pattern. The predefined BRS pattern is such that, for a time-frequency resource, BRSs for different beams are transmitted on the time-frequency resource in different subframes. The wireless device further comprises a reporting module operable to send a BRS-RP report to a first base station of the first RAN via a second base station of a second RAN, the BRS-RP report comprising BRS-RP measurement values for at least some of the time-frequency resources assigned to the BRSs. The wireless device further comprises a message reception module operable to receive, from the first RAN, a message comprising timing information for the first base station and a node identifier of a base station from which the message was transmitted. The wireless device further comprises a second reporting module operable to send, via the second base station of the second RAN, a second BRS-RP report comprising one or more second BRS-RP measurement values and (a) timing information for the one or more second BRS measurement values that is based on the timing information for the first base station and/or (b) the node identifier of the base station from which the message was transmitted.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
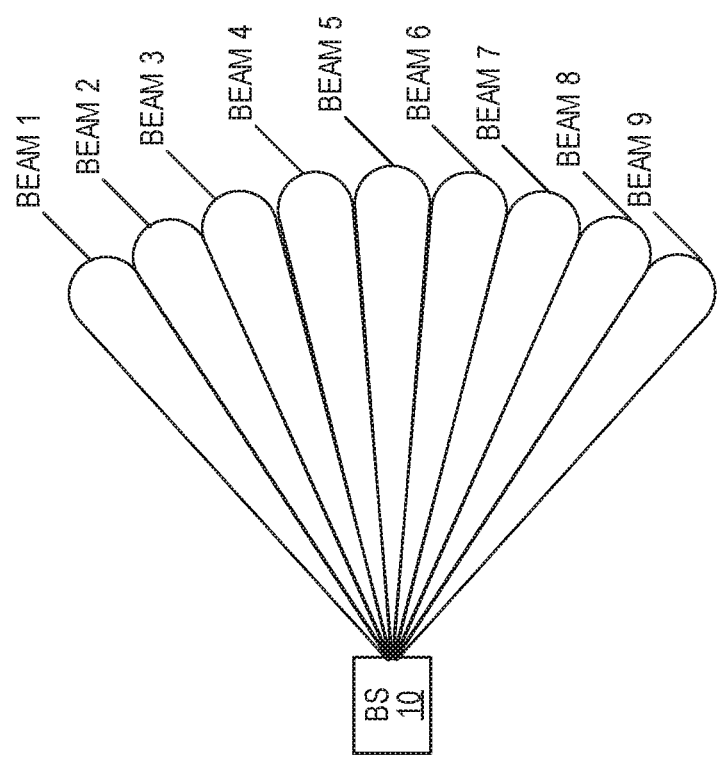
FIG. 1 illustrates an example of a radio network node in a cellular communications network that utilizes Transmit (Tx)-beamforming to transmit multiple downlink beams.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Network Node:

As used herein, a "radio network node" is any node in a Radio Access Network (RAN) of a cellular communications network/system that operates to wirelessly transmit and/or receive signals. Some examples of a radio access node include, but are not limited to, a base station (e.g., an enhanced or evolved Node B (eNB) in a Third Generation Partnership Project (3GPP) Long-Term Evolution (LTE) network, a base station in a new (e.g., Fifth Generation (5G) Radio Access Network (RAT)), a high-power or macro base station, a low-power base station (e.g., a micro base station, a pico base station, a home eNB, or the like), and a relay node.

Wireless Device:

As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP LTE network, a Machine-Type Communication (MTC) device, and a Machine-to-Machine (M2M) device.

Beam Reference Symbol (BRS) Pattern:

As used herein, a "BRS pattern" is a pattern of time-frequency resources utilized for transmission of BRSs.

BRS Group:

As used herein, a BRS group is a group of BRS constructed by different BRS sequences. Different BRS groups use different BRS sequences. The BRS sequences in a BRS group are transmitted from the same radio network node.

Systems and methods for enabling the use of BRS and BRS Received Power (BRS-RP) reporting for selection of a "best" beam for transmitting to a wireless device (e.g., a UE)

in a RAN of a first RAT (sometimes referred to herein as a "new" RAT) in a dual-connectivity cellular communications system in which control signaling transmitted from the wireless device to the first RAT is provided via control signaling to a second RAN of a second, or assisting, RAT (sometimes referred to herein as a "legacy" RAT) such as LTE. However, before describing embodiments of the present disclosure, a discussion of some problems that arise in such a dual-connectivity scenario is beneficial.

As discussed above, radio network nodes in the first RAN of the first, or new, RAT transmit beamformed reference signals/symbols, referred to as BRSs, comprising a sequence that enables a wireless device to measure the BRS-RP on different beams transmitted from different radio access nodes. The wireless device then reports the BRS-RP measurements, or measurement values, to the first RAN via, in the dual-connectivity scenario, control signaling transmitted to the second RAN of the second, or assisting, RAT.

A problem with the above way of measuring BRS-RP on the first RAT and reporting it over a different, or second, RAT is that there is an ambiguity as to which beam the wireless device has measured on due to the limited timing information before the connection to the new RAT has been established. This is a problem if the wireless device needs to measure several BRS subframes exceeding the timescale known to the wireless device to report the best beam among all beams in the system. The actual BRS transmission which corresponded to the reported best beam (i.e., the beam for which the wireless device measured the best (e.g., highest) BRS-RP) will be unknown, i.e., the radio network node of the first RAT does not know which actual beam that is the best beam. In the described dual-connectivity scenario, the wireless device sends the first BRS-RP report via a different network (which hereinafter is referred to as being an LTE network but is not limited thereto) before it is scheduled by the new RAT network and, as such, the new RAT System Frame Number (SFN) is not known by the wireless device. Thus, when the new RAT radio network node is reached by a BRS-RP report via the LTE network saying that the beam transmitted in Orthogonal Frequency-Division Multiplexing (OFDM) symbol x (i.e., OFDM symbol number x or OFDM symbol position x) and frequency allocation k had the highest value, it is not known which SFN and subframe, and hence which beam, the report refers to.

For example, assume that the best BRS-RP value was measured in OFDM symbol s=7 and frequency resource k=1. Referring to the example of FIG. 3, the measurement can represent beams numbered 8, 22, 36, or 50, depending on the subframes n, n+m, n+2m, or n+3m in which the measurement was taken. A potential solution to this problem could be to include some subframe number or other timing information in each beam. However, this is a very expensive solution since this information would have to be included in all BRS/beams, i.e., in all OFDM symbols and all utilized frequency resources. The high expense of "broadcasting" information in all beams/to all users is an inherent drawback of beam-based transmissions.

A further problem with the above approach is that there may not be enough BRS groups so that the BRS transmitted from all new RAT radio network nodes are unique. This means that in addition to the subframe/beam ambiguity noted above, it is not possible to distinguish between multiple new RAT radio network nodes if they are assigned the same BRS group.

Systems and methods are disclosed herein for resolving the aforementioned subframe/beam ambiguity and/or RAT radio network node ambiguity. In certain embodiments, a wireless device, or UE, sends BRS-RP reports via an assisting RAT such as LTE. A best beam and node is subject to ambiguity due to limited time information in the report. The new RAT network provides accurate time information using dedicated control signaling transmitted from multiple candidate nodes and beams based on the initial BRS-RP. The wireless device sends the next BRS-RP report with accurate timing information for each reported BRS time/frequency resource, e.g., SFN and subframe index within one radio frame. The new RAT radio network node can then deduce which node and beam was the best one. Further downlink transmission can then continue from this node and beam only. This part of the procedure could be an amended version of the BRS-RP reporting as described above.

In the described dual-connectivity scenario, the SFN of the new RAT is not available in the first BRS-RP report sent via the assisting network (e.g., the LTE network). Since the SFN is unknown to the wireless device before a link has been established with the new RAT, it is not possible to include accurate timing information in the first BRS-RP report. Upon receiving a BRS-RP report containing a highest BRS-RP value corresponding to a strongest beam, the new RAT radio network node will use all beams that correspond to this time/frequency location and transmit separate messages to the wireless device containing timing information, e.g., SFN. These messages are thus transmitted on multiple beams where one of them corresponds to the beam that the wireless device reported as having the best BRS-RP. The wireless device sends a second BRS-RP report with accurate timing information (e.g., SFN and subframe index) after receiving the timing information from the new RAT radio network node, and the best beam can be deduced by the new RAT radio network node.

In the case of the radio network node identification problem, the new RAT radio network node could in some cases resolve this in a similar manner, if able to ensure that the transmitted messages containing the timing information all are sent during distinct occasions. As an alternative, the new RAT radio network node transmits a radio network node identifier instead of (or in combination with) the timing information. The radio network node identifier is echoed back by the wireless device and, upon receiving this identifier, the network can determine which radio network node in the new RAT that the wireless device heard and reported.

Certain potential benefits of the proposed solution are that the timing ambiguity (and as a consequence the beam selection ambiguity) that results when running the control signaling of a new RAT (e.g., 5G) over another RAT (e.g., LTE) in a dual-connectivity set-up as well as the base-station ambiguity that results when the same BRS group is assigned to a different new RAT base station, is resolved.

Figure 4:
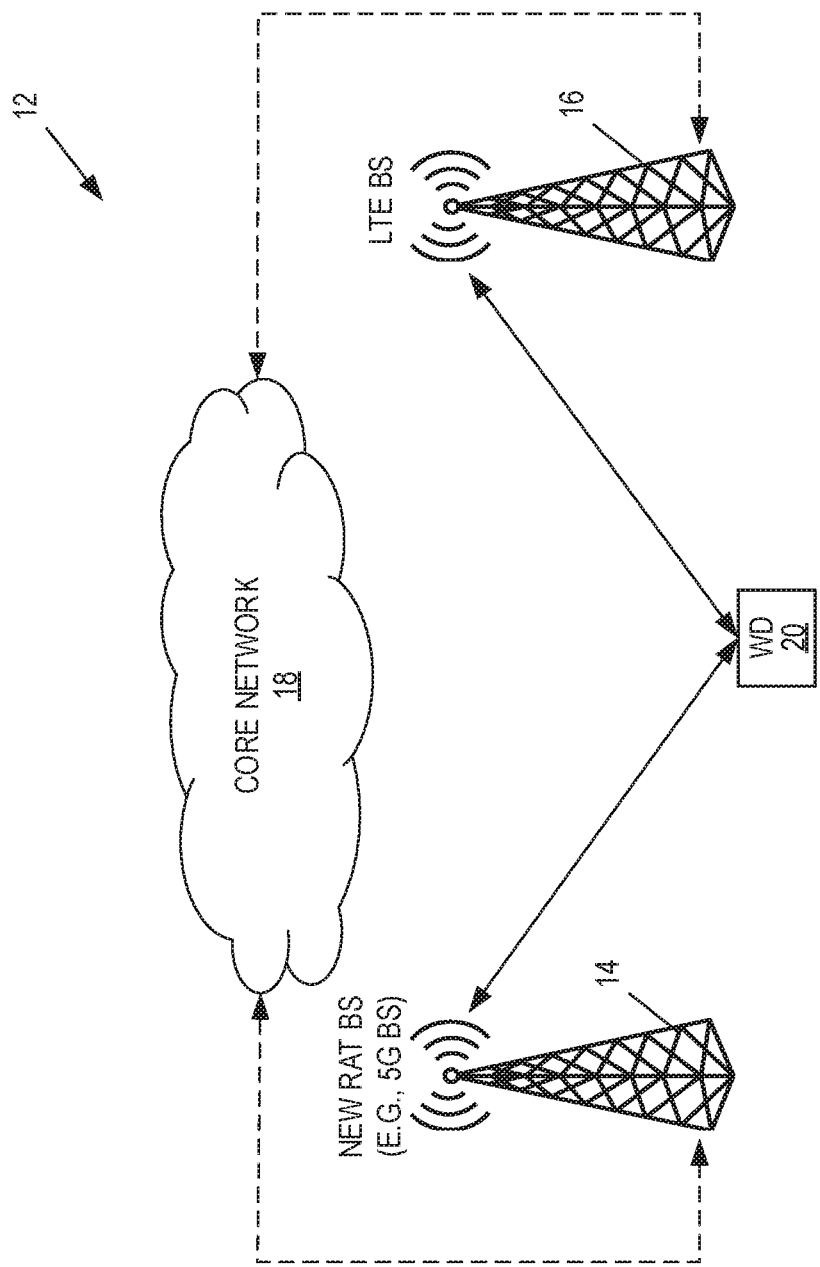
FIG. 4 illustrates a cellular communications system in which a wireless device sends controlling signaling to a new Radio Access Technology (RAT) base station via an assisting RAT base station according to a dual-connectivity scheme according to some embodiments of the present disclosure.

FIG. 4 illustrates a cellular communications system 12 that includes a new RAT base station 14 and, in this example, an LTE base station 16 according to some embodiments of the present disclosure. For example, the new RAT base station 14 may be a 5G base station. However, the present disclosure is not limited by the term "new;" rather, the concepts disclosed herein are equally applicable to any RAT that utilizes Transmit (Tx)-beamforming to transmit multiple beams. Further, while LTE is used as an example, the base station 16 may be a base station of any RAT different than that of the new RAT base station 14. This other RAT may be referred to herein as an assisting RAT. The base stations 14 and 16 may more generally be referred to as radio network nodes. Note that while only one new RAT base station 14 is illustrated, the cellular communications system 12 may include multiple or many new RAT base stations 14.

The base stations 14 and 16 are communicatively connected by, in this example, a core network 18. A wireless device 20, or UE, communicates with both the new RAT base station 14 and the LTE base station 16 according to a dual-connectivity scheme. In other words, using dual connectivity, the wireless device 20 is able to transmit data to and receive data from the new RAT base station 14 and transmit control signaling to the LTE base station 16.

Resolving Downlink Beam Ambiguity

Assume a system where the new RAT base station 14 (i.e., the new RAT radio network node) transmits BRS in designated subframes as described in the Background section above. Further, assume that different BRSs are used for each OFDM symbol and the set of BRSs used in a subframe constitutes a "BRS group" as described above. In the frequency domain, one or several blocks of Physical Resource Blocks (PRBs) are reserved for BRS transmission, denoted by k={0, 1, 2, 3} in FIG. 3. The new RAT base station 14 uses the same BRS transmission in all such frequency resources and also in all scheduled BRS subframes. The numbers inside the frequency resources in FIGS. 2 and 3 correspond to different beam directions.

Figure 2:
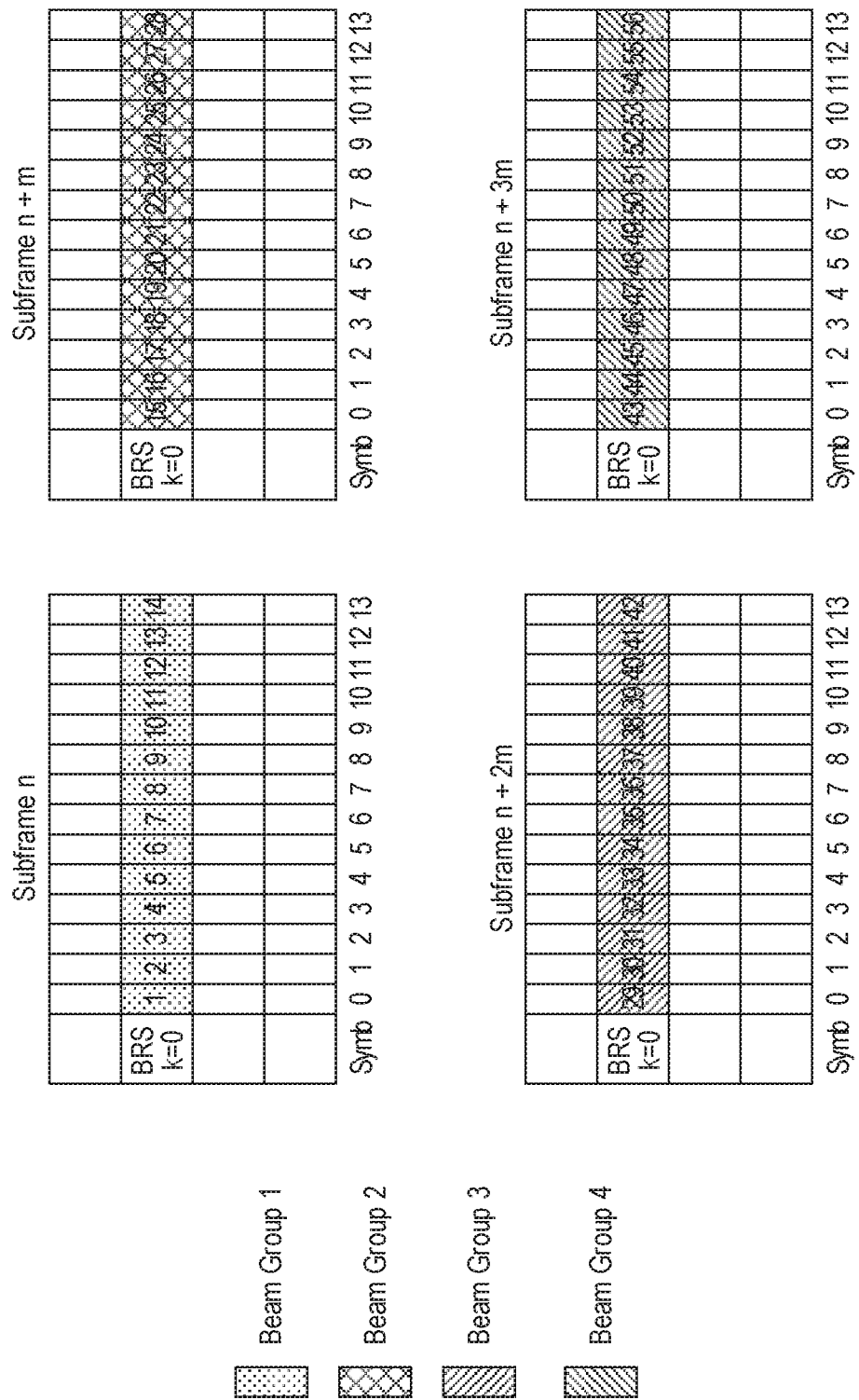
FIG. 2 depicts an example Beam Reference Symbol (BRS) pattern that defines time-frequency resources for transmission of BRSs on different beams.
Figure 3:
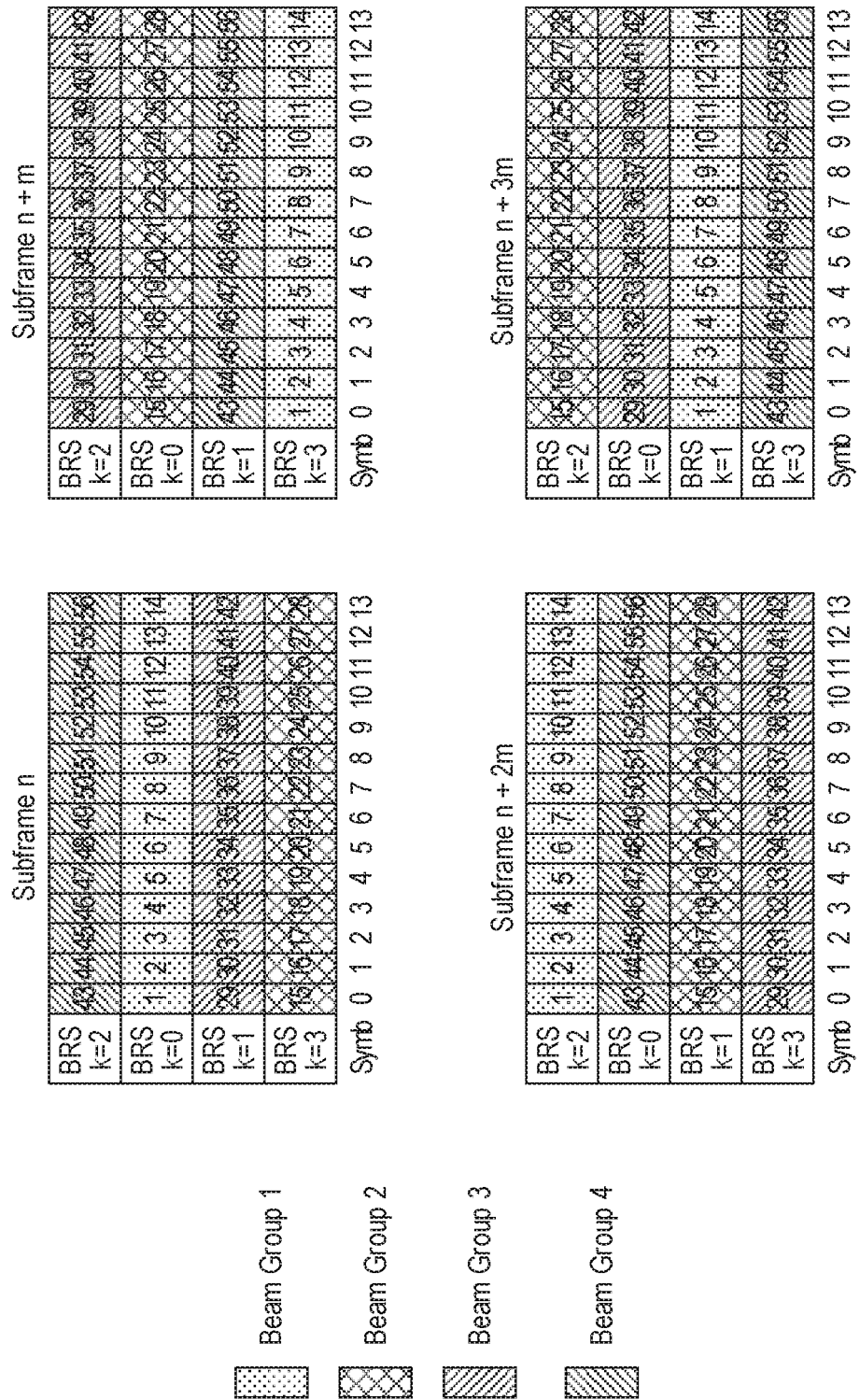
FIG. 3 depicts an example BRS pattern that provides frequency diversity.
Figure 5A:
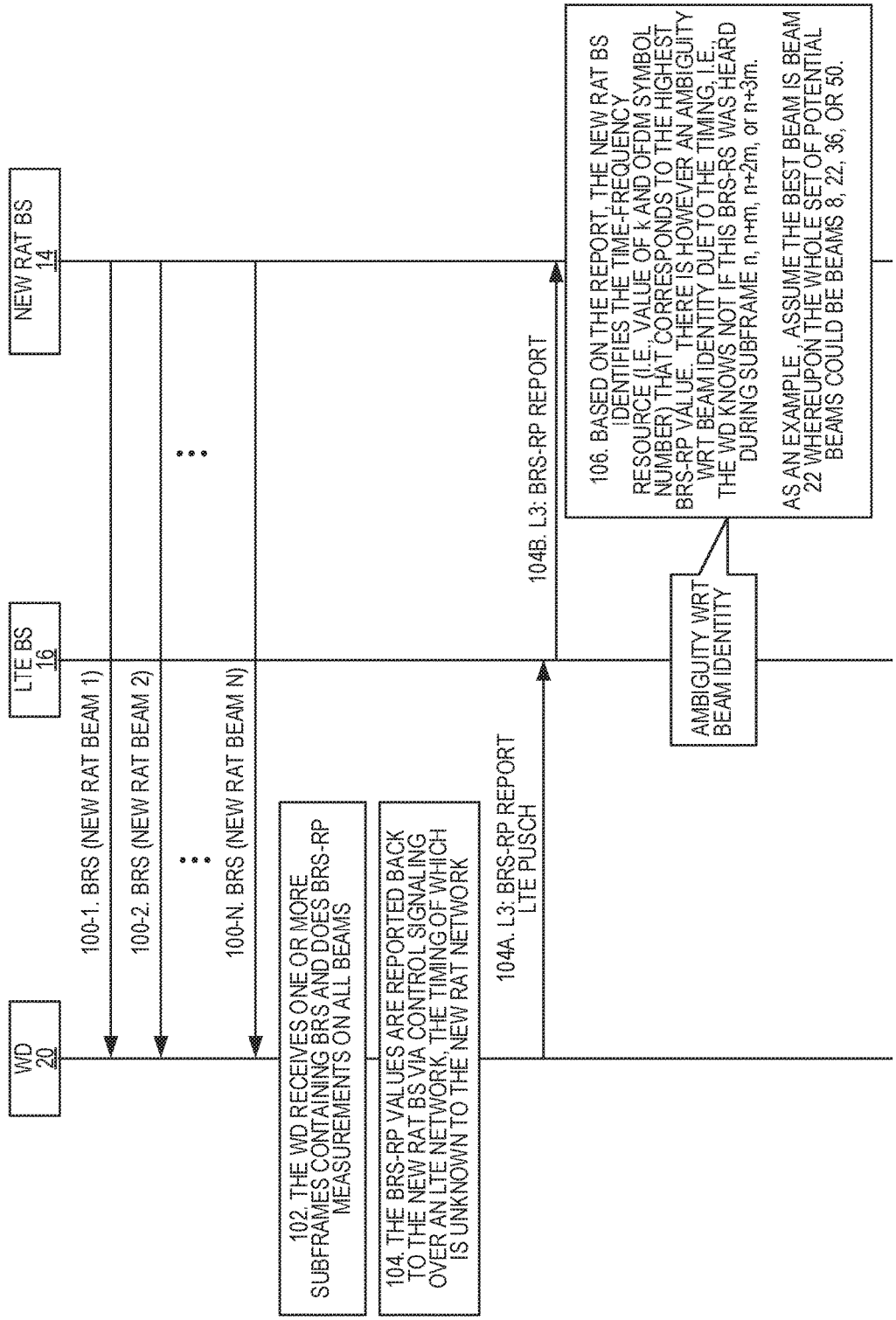
FIGS. 5A through 5C illustrate the operation of the cellular communications system of FIG. 4 to resolve downlink beam ambiguity according to some embodiments of the present disclosure.
Figure 5B:
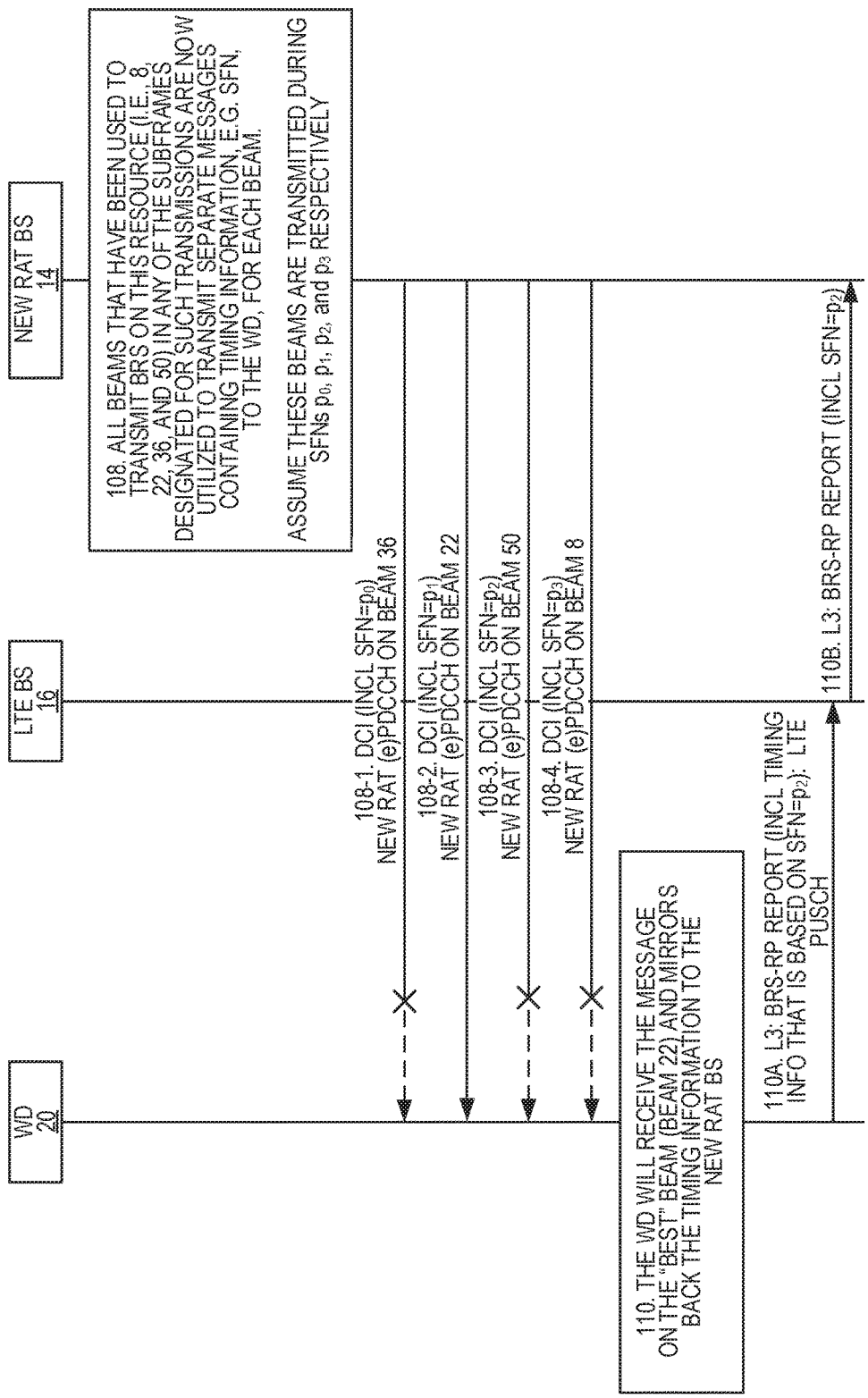
Figure 5C:
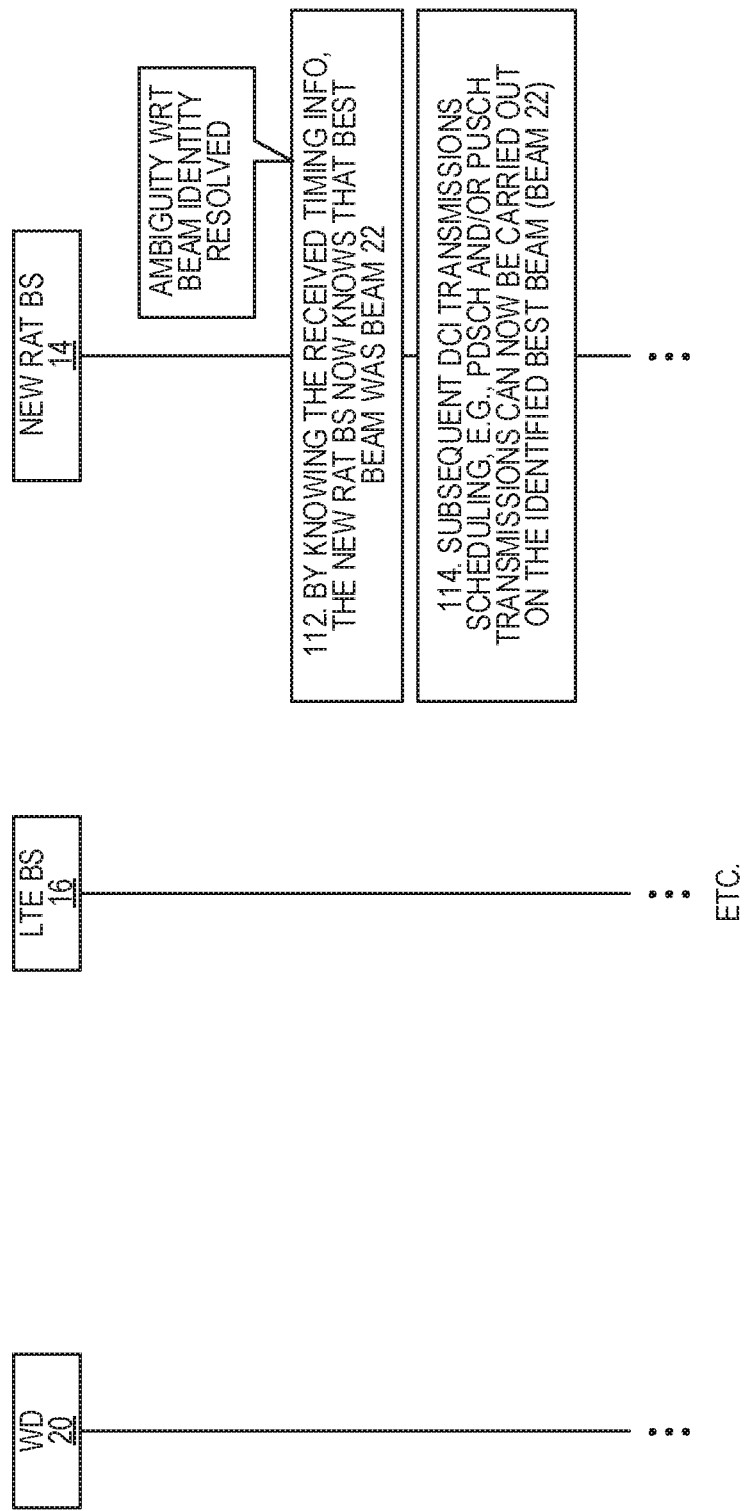

FIGS. 5A through 5C illustrate the operation of the cellular communications system 12 of FIG. 4, according to some embodiments of the present disclosure, to resolve the downlink beam ambiguity that results when the measurement report is transmitted to the new RAT base station 14 over, in this example, an LTE network with a timing that is unknown in the new RAT network. As illustrated, the new RAT base station 14 transmits BRSs on multiple beams across multiple subframes according to a predefined BRS pattern (steps 100-1 through 100-N), where "N" is the number of beams transmitted from the new RAT base station 14. As used herein, a BRS pattern assigns, or maps, different BRSs to different time-frequency resources within multiple subframes. FIGS. 2 and 3 give two examples of a BRS pattern. The BRS pattern is predefined such that, for a time-frequency resource, BRSs for different beams are transmitted on the time-frequency resource in different subframes. Looking at FIG. 2 as an example, time-frequency resource k=0 and OFDM symbol 7 is assigned to, or maps to, via the BRS pattern, BRS for beam 8 in subframe n, BRS for beam 22 in subframe n+m, BRS for beam 36 in subframe n+2m, and BRS for beam 50 in subframe n+3m.

The wireless device 20 receives one or more subframes containing BRSs transmitted by the new RAT base station 14 and, potentially, one or more new RAT base stations 14 (that are assigned to, in this example, different BRS groups than the new RAT base station 14) and performs BRS-RP measurements on all beams (step 102). Note that the wireless device 20 does not know which beams those signals (i.e., the received BRSs) are transmitted on; the wireless device 20 only performs measurements on each time-frequency resource designated for BRS transmissions (which are referred to herein as BRS time-frequency resources). The wireless device 20 reports the BRS-RP values (also referred to herein as BRS-RP measurement values) back to the new RAT base station 14 via control signaling over an LTE network, the timing of which is unknown to the new RAT network (step 104). More specifically, as illustrated, the wireless device 20 sends a BRS-RP report to the LTE base station 16 via, in this example, the LTE Physical Uplink Shared Channel (PUSCH) (step 104A). The LTE base station 16 sends the BRS-RP report to the new RAT base station 14 (e.g., via signaling over the core network 18) (step 104B).

Based on the BRS-RP report, the new RAT base station 14 identifies the time-frequency resource (i.e., value of k and OFDM symbol number, e.g., in the example BRS patterns of FIGS. 2 and 3) that corresponds to the highest BRS-RP measurement value (step 106). There is, however, an ambiguity with respect to the beam identity corresponding to the highest BRS-RP measurement value due to the timing issue (i.e., the wireless device 20 does not know whether the BRS-RP measurement was made in subframe n, n+m, n+2m, or n+3m in the examples of FIGS. 2 and 3). For instance, in the example BRS pattern of FIG. 2, if the time-frequency resource is OFDM symbol 7 and k=0, then there is ambiguity as to whether the best beam is beam 8, 22, 36, or 50. In other words, if the best beam is (unknown to the wireless device 20) beam 22, then there is ambiguity at the new RAT base station 14 as to whether the identified time-frequency resource corresponding to the best BRS-RP measurement value is for beam 8, 22, 36, or 50.

All beams that have been used to transmit BRSs on the identified time-frequency resource in any of the subframes designated for such transmissions are now utilized by the new RAT base station 14 to transmit separate messages containing timing information, e.g. the current SFN, to the wireless device 20 (step 108). For example, in some embodiments, the new RAT base station 14 transmits separate Downlink Control Information (DCI) messages containing timing information using the beams used to transmit BRS on the identified time-frequency resource (steps 108-1 through 108-4). Continuing the example above, separate DCI messages are transmitted on beams 8, 22, 36, and 50. The separate messages include timing information (e.g., SFNs) for the respective beams (e.g., $p_0$ indicating the SFN in which beam 36 is transmitted, $p_1$ indicating the SFN in which beam 22 is transmitted, p2 indicating the SFN in which beam 50 is transmitted, and $p_3$ indicating the SFN in which beam 8 is transmitted).

The wireless device 20 will receive the message on the "best" beam, and potentially other beams as well, and, in this example, report BRS-RP together with accurate timing information of the measurement to the new RAT base station 14 via the LTE base station 16 (step 110). In other words, the wireless device 20 generates a new BRS-RP report that includes new BRS-RP measurements along with respective timing information (e.g., SFN+subframe index) that is based on the timing information (e.g., SFN) included in the received message(s). Note that if the wireless device 20 receives only a single message in step 110, then the new BRS-RP report includes new BRS-RP measurements with respective timing information that is based on the timing information in the received message. However, if the wireless device 20 receives multiple messages in step 110, then the new BRS-RP report may include new BRS-RP measurements with respective timing information that is based on the timing information in any one of the received messages (e.g., the message received on the best beam). The wireless device 20 sends the new BRS-RP report to the LTE base station 16 (step 110A), and the LTE base station 16 sends the new BRS-RP report to the new RAT base station 14 (step 110B). The following is an example of a BRS-RP report with two measured BRS-RP values on different resources:

Assume subframe 0 and 25 in each radio frame is used to transmit BRS.

SFN=20 is included in the BRS-RP report sent to the network.

BRS resource a, SFN index=0 (SFN=20), subframe index=1 (subframe=25), BRS-RP=x. Note that the BRS resource here is not the same as BRS frequency resource k=0, 1, 2, 3. The reported BRS resource is encoded from BRS resource ID and BRS symbol time and frequency resource k. The BRS resource ID can, for example, be the same as the SSS ID used in LTE or other possible sequence.

BRS resource b, SFN index=1 (SFN=21), subframe index=0 (subframe=0), BRSRP=y

Based on the timing information and the BRS-RP report, the new RAT base station 14 can determine which of the beams (e.g., which of beams 8, 22, 36, and 50 in the example above) is the best beam (step 112). Note that the best beam determined based on the timing information and the BRS-RP report in step 112 does not necessarily have to be one of the potential best beams (beams 8, 22, 36, and 50 in this example). Rather, the best beam is the best beam as reported in the BRS-RP report (e.g., the best beam may have changed since the previous BRS-RP report). Subsequent DCI transmissions can now be carried out on this identified best beam, which could be, e.g., to schedule further Physical Downlink Shared Channel (PDSCH) from the new RAT base station 14 to the wireless device 20 or Physical Uplink Shared Channel (PUSCH) transmissions from the wireless device 20 to the new RAT base station 14 (step 114). Note that using the best beam determined in the fashion described herein for PUSCH transmission requires reciprocity between the uplink and the downlink, and the best beam is translated into being the Rx-beam at the new RAT base station 14.

Note that, in some cases, the ambiguity (step 106 above) could be limited by being able to determine the delay over LTE, or at least set an upper limit on it. Assume, e.g., that we are confident that the delay over LTE is never more than one radio frame (i.e., m subframes), then this knowledge may be used to limit the subset of beams in which the radio network node needs to respond. In other words, if the new RAT base station 14 knows that the BRS-RP report is never older than the duration of m subframes, the new RAT base station 14 also knows which BRSs to rule out since it transmits on them during that time frame.

Also note that, in step 110, the message sent by the wireless device 20 containing the timing information does not necessarily need to be sent via LTE (as depicted in FIG. 5B) but could in some situations (e.g., assuming that no random-access procedure is needed to acquire Timing Advance (TA), etc.) be sent via the new RAT (not depicted). If so, and if the BRS-RP measurement reporting is applied (as per the above paragraph) and if also the time required for performing the BRS-RP measurements is known, then the timing ambiguity can be resolved by this in the new network.

Resolving Network Node Ambiguity

Resolving the ambiguity of which radio network node that was actually received in the case when BRSs from one of two different nodes using the same BRS group are received at the wireless device 20 follows the same principle as described above with respect to beam ambiguity.

Figure 6A:
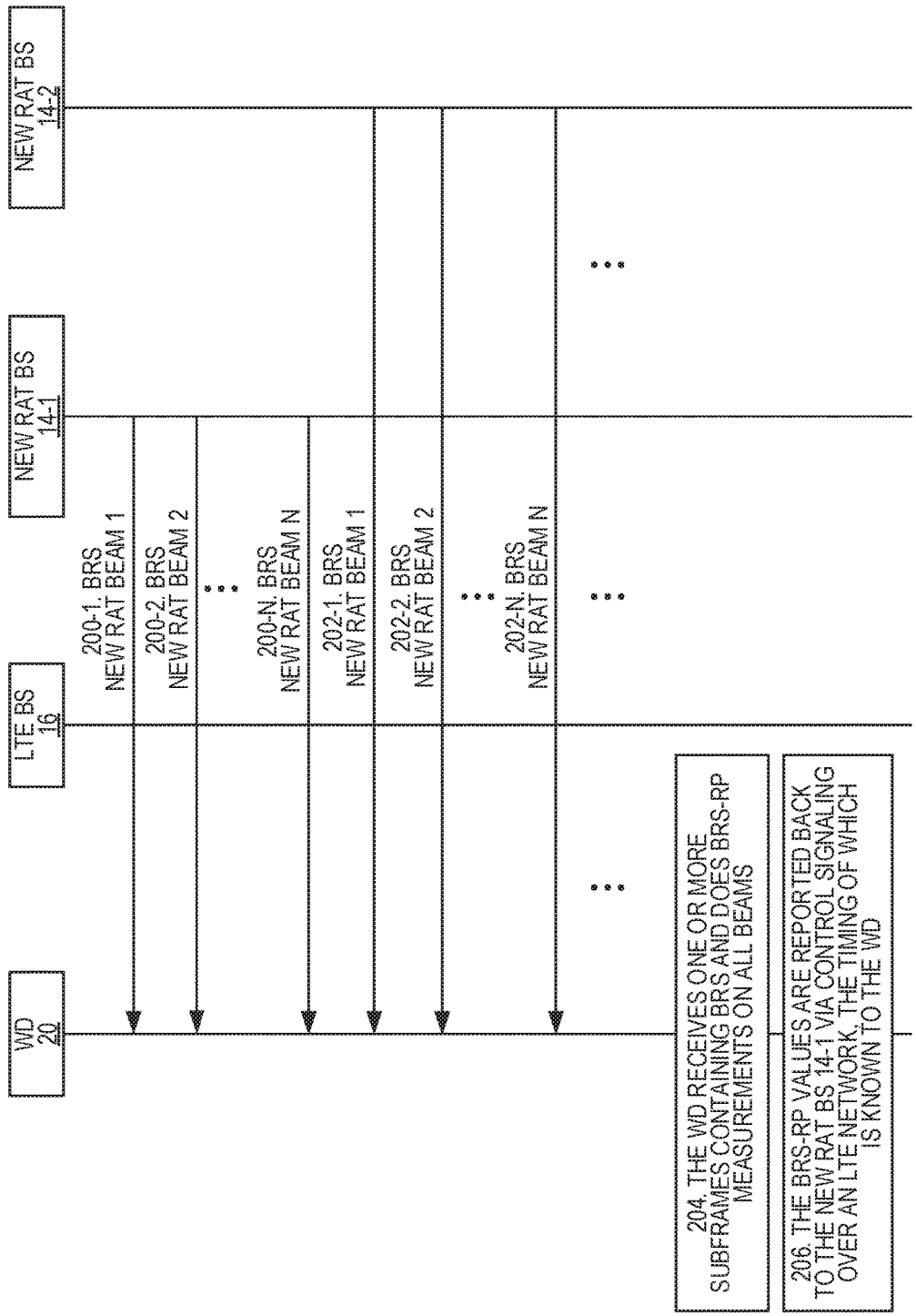
FIGS. 6A through 6C illustrate the operation of the cellular communications system of FIG. 4 to resolve node ambiguity according to some embodiments of the present disclosure.
Figure 6B:
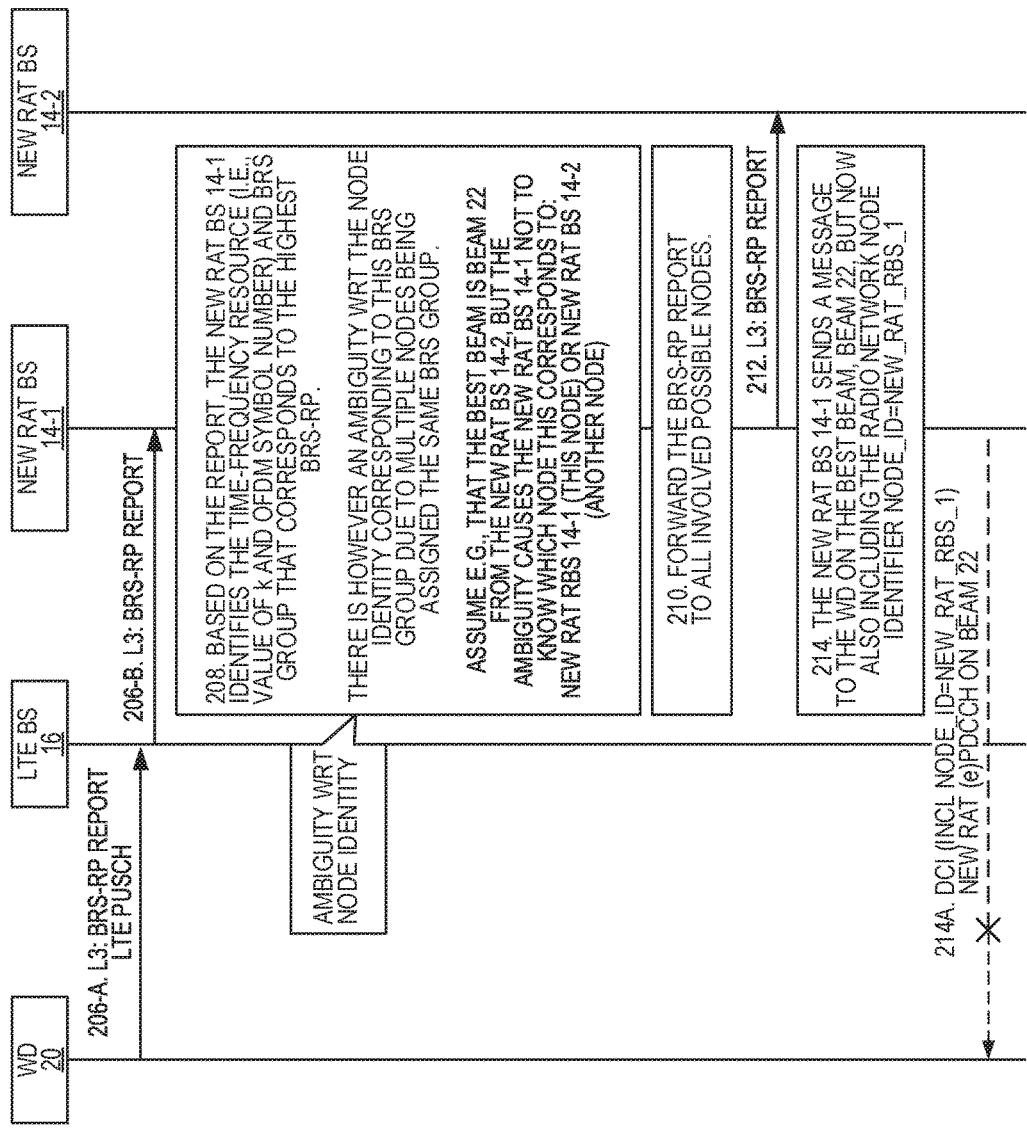
Figure 6C:
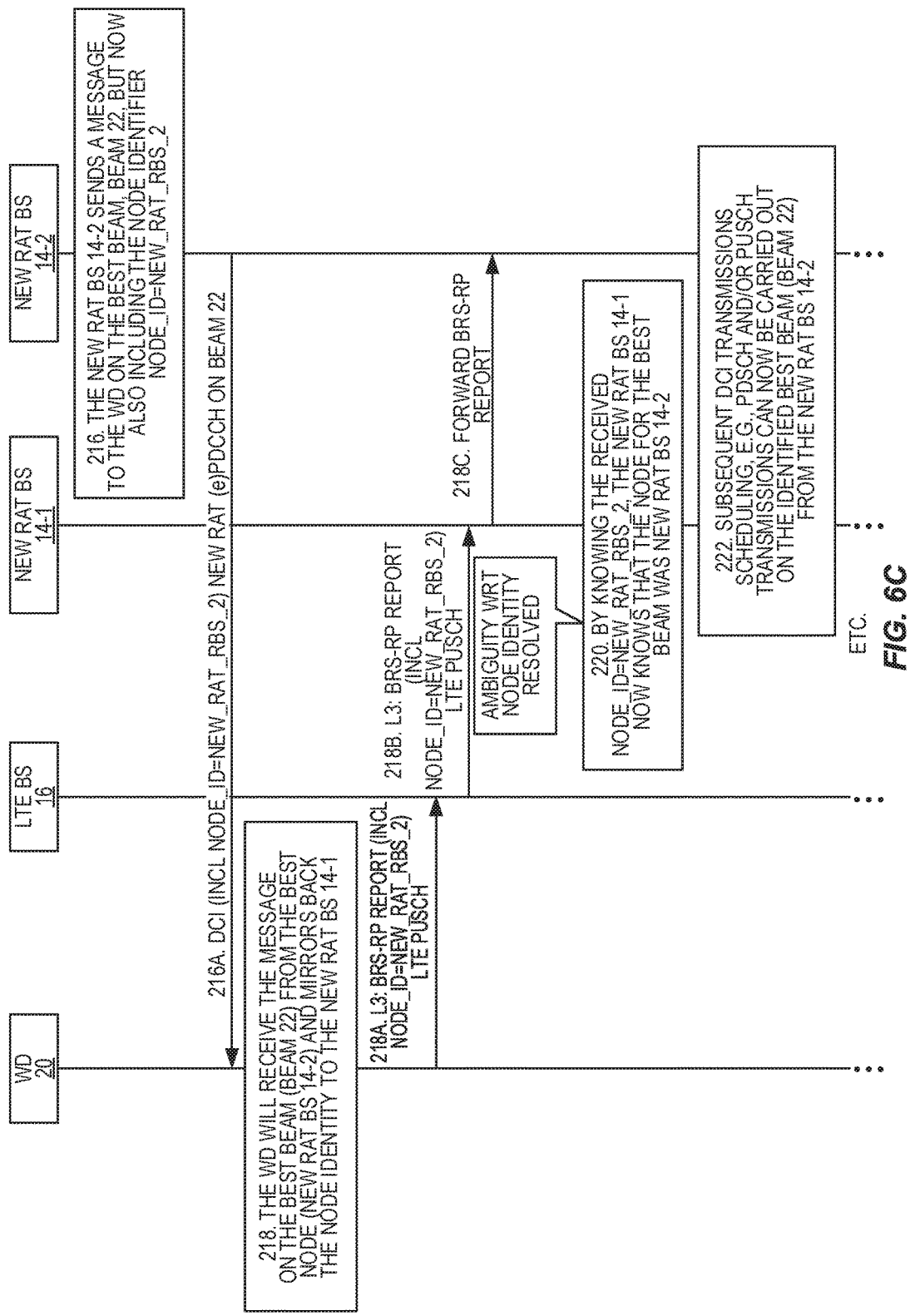
Figure 7A:
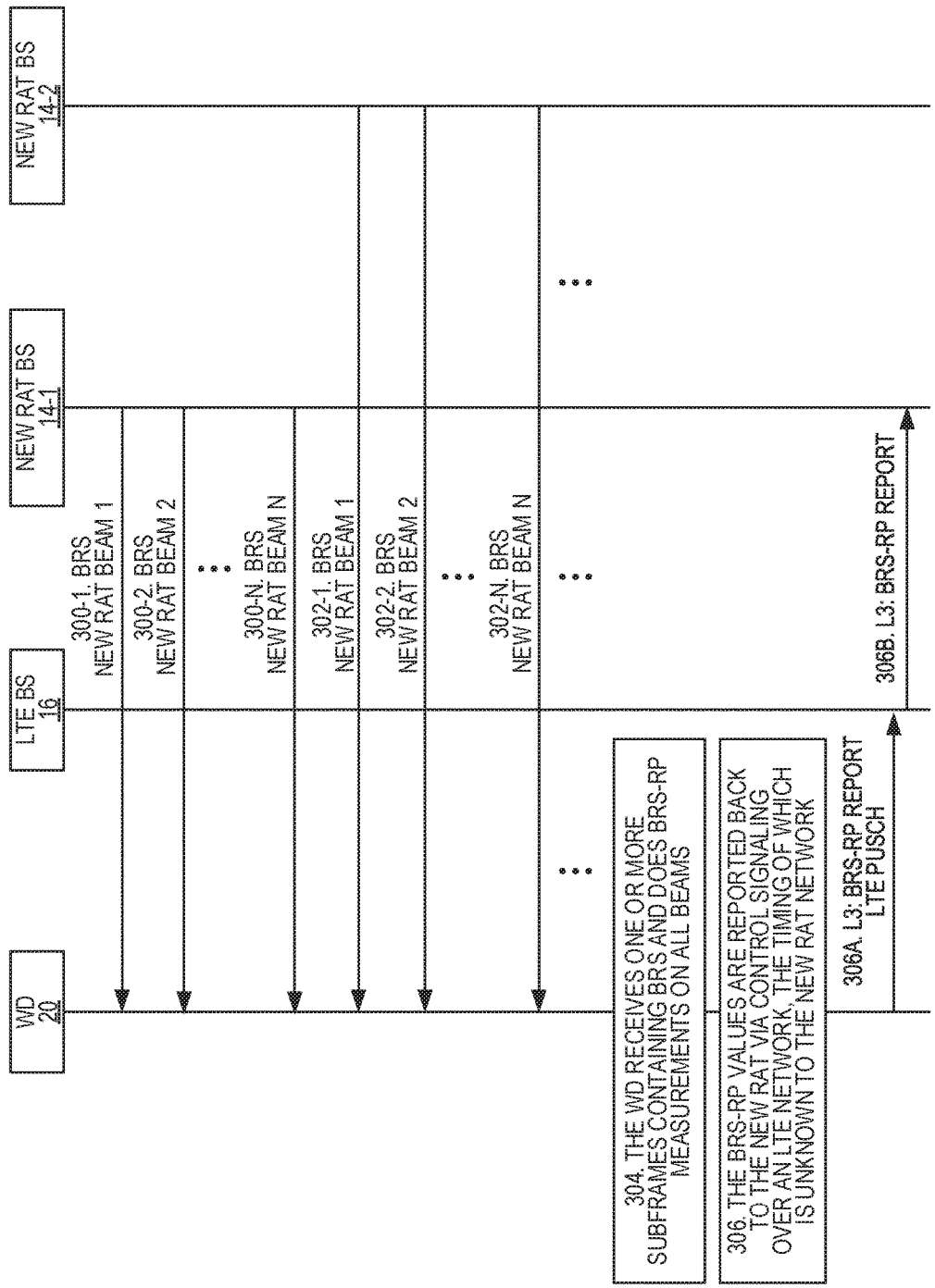
FIGS. 7A through 7E illustrate the operation of the cellular communications system of FIG. 4 to resolve both downlink beam and node ambiguity according to some embodiments of the present disclosure.
Figure 7B:
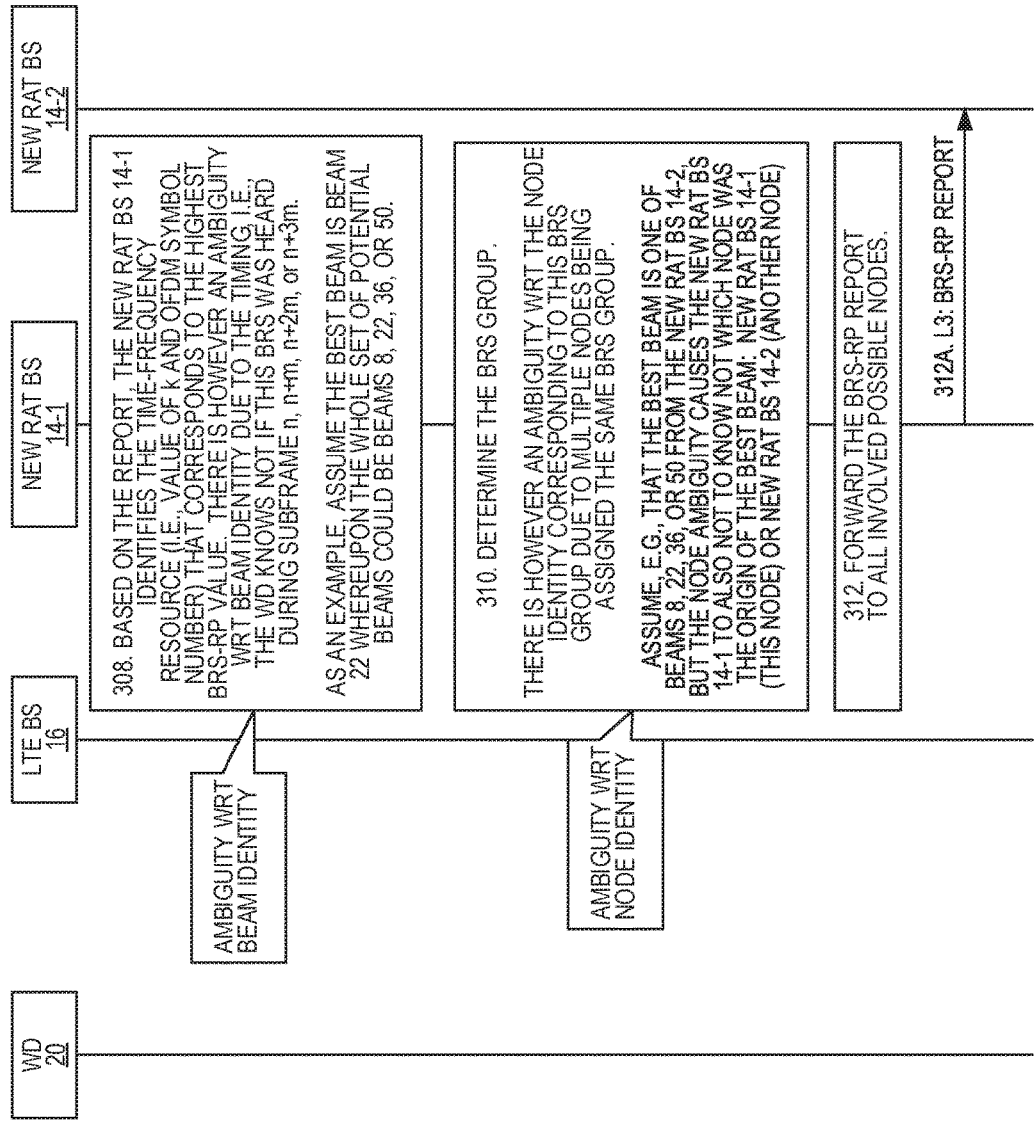
Figure 7C:
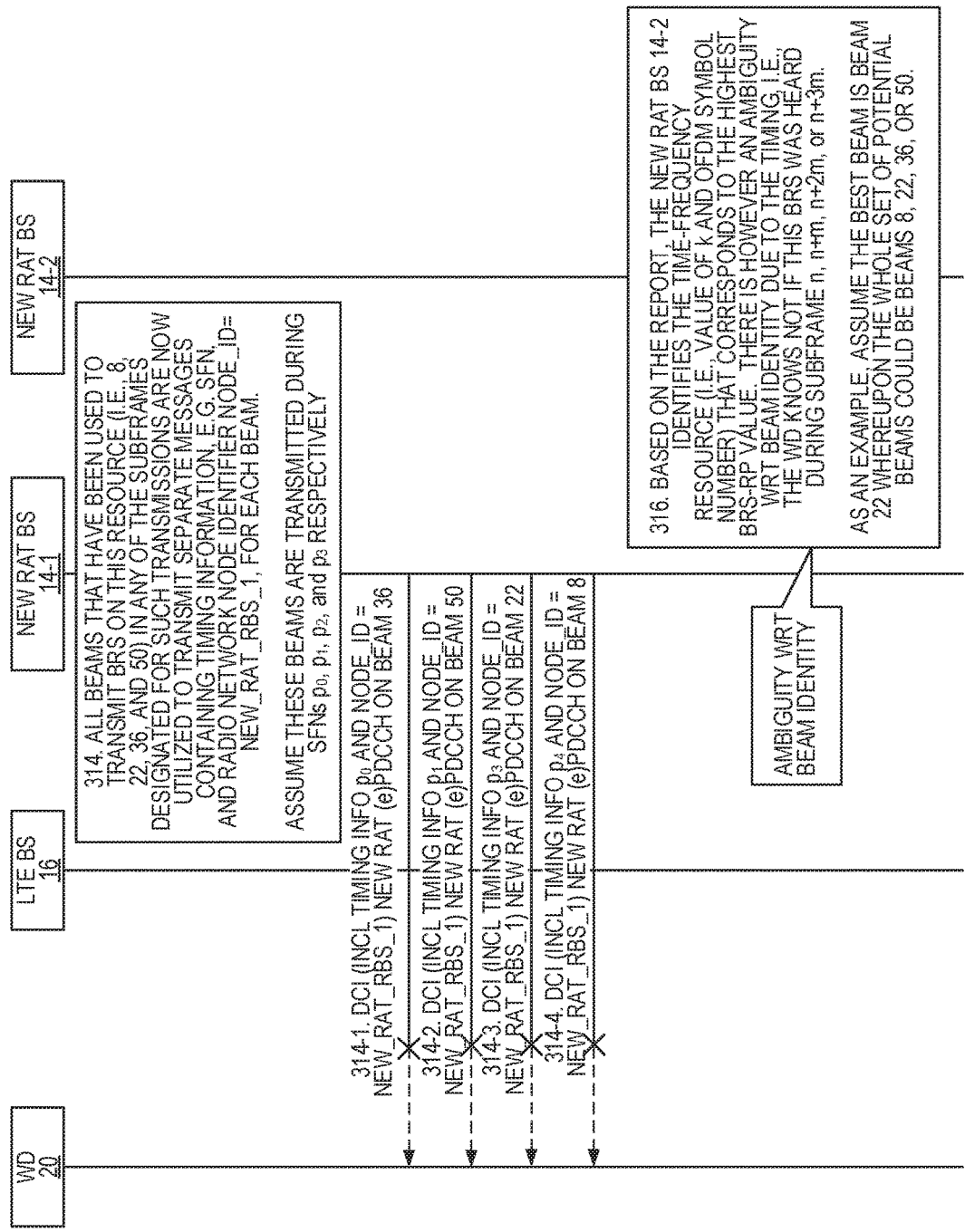
Figure 7D:
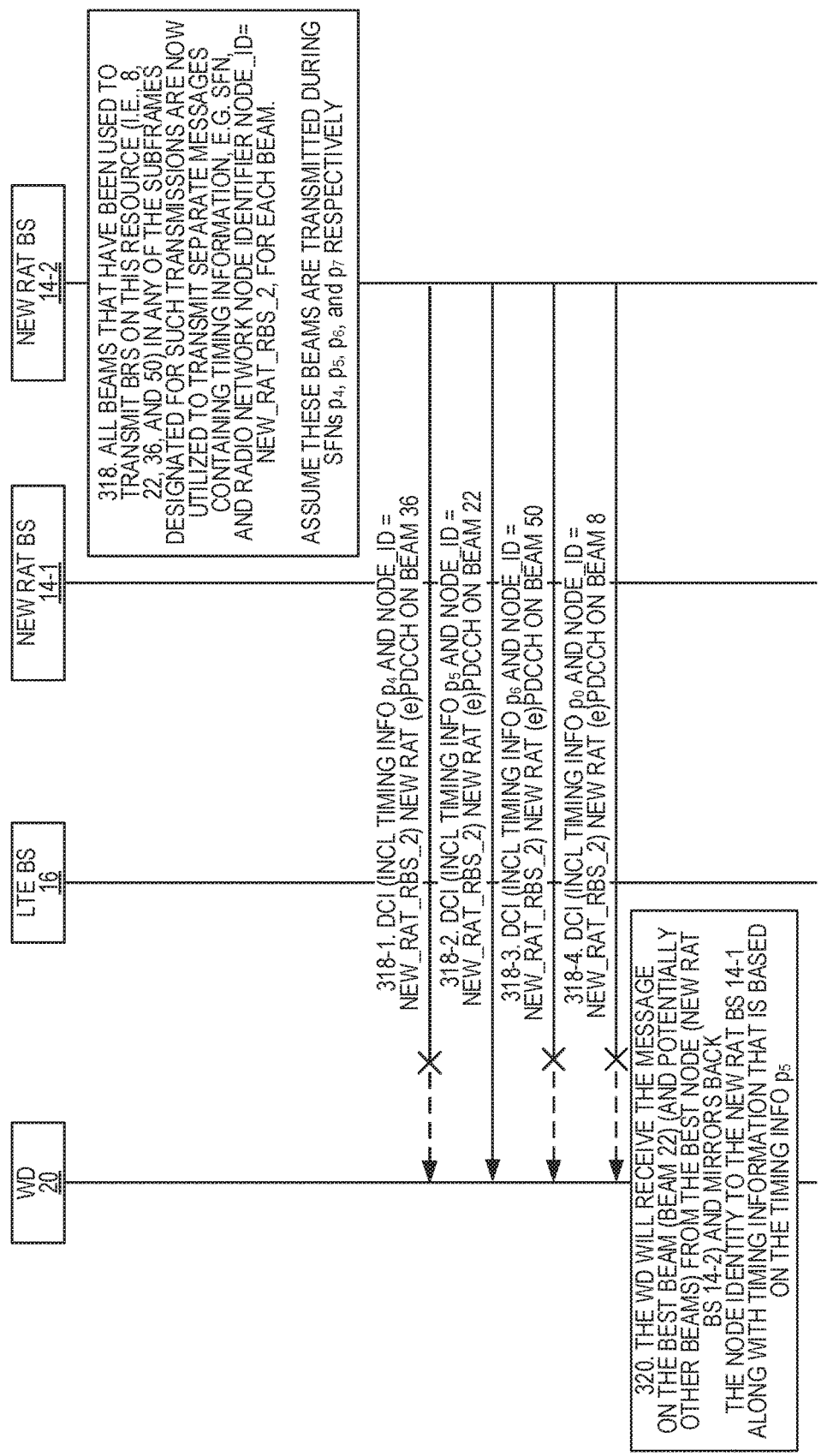
Figure 7E:
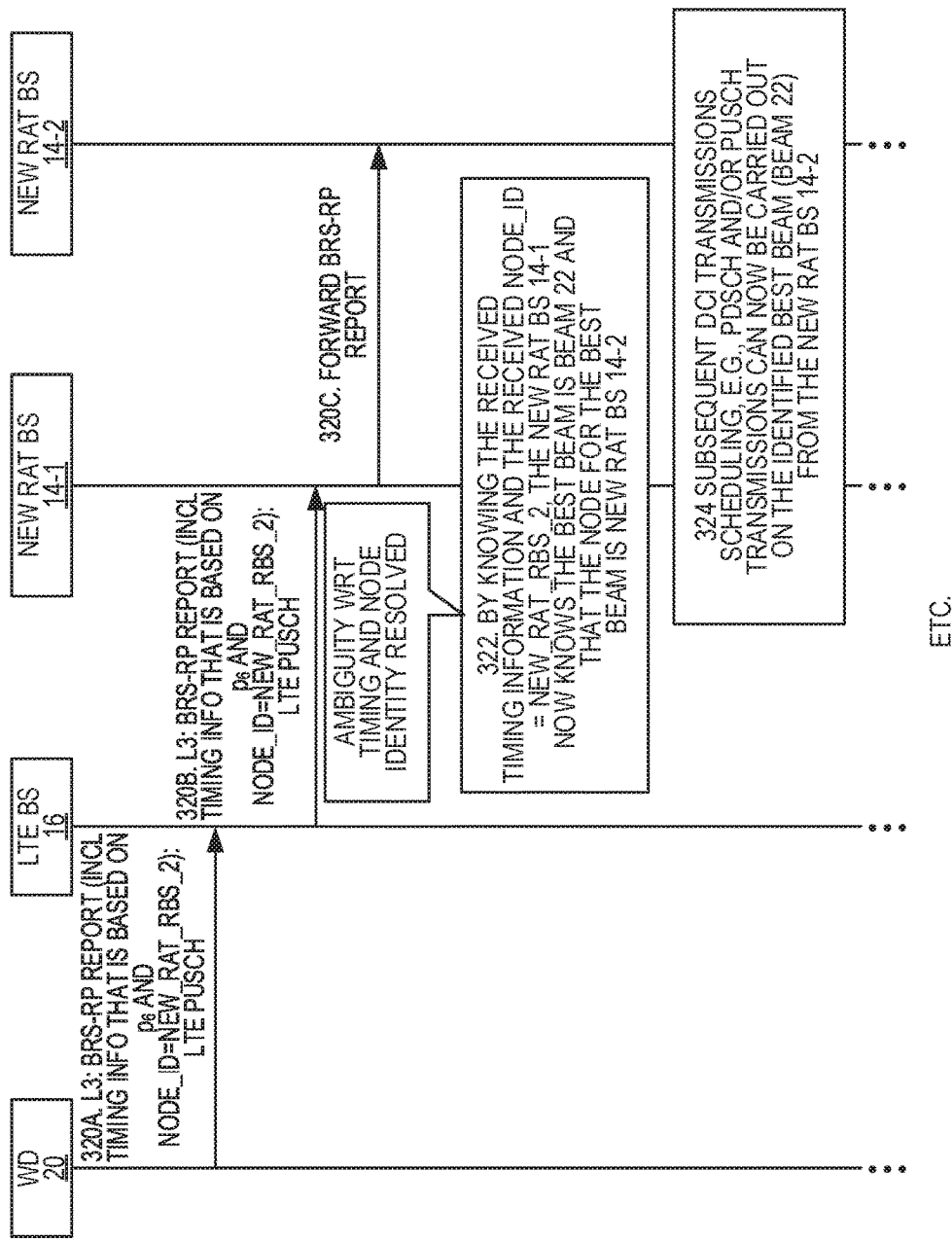

More specifically, FIGS. 6A through 6C illustrate the operation of the cellular communications system 12 of FIG. 4 to resolve the radio network node ambiguity according to some embodiments of the present disclosure. In this example, there are two new RAT base stations 14, which are referred to as new RAT base stations 14-1 and 14-2 for clarity.

As illustrated, the new RAT base station 14-1 transmits BRSs on multiple beams across one or more subframes according to a predefined BRS pattern (steps 200-1 through 200-N), where "N" is the number of beams transmitted from the new RAT base station 14-1. Likewise, the new RAT base station 14-2 transmits BRSs on multiple beams across multiple subframes according to the predefined BRS pattern (steps 202-1 through 202-N). In this example, the new RAT base stations 14-1 and 14-2 are assigned to the same BRS group and, as such, transmit the same BRS sequences on the same BRS time-frequency resources.

The wireless device 20 receives one or more subframes containing BRSs transmitted by the new RAT base stations 14-1 and 14-2 (and potentially one or more other new RAT base stations in the same or different BRS groups) and performs BRS-RP measurements on all beams (step 204). The wireless device 20 reports the BRS-RP values (also referred to herein as BRS-RP measurement values) back to the new RAT base station 14-1 via control signaling over an LTE network, the timing (e.g., SFN) of which is known to the wireless device 20 (step 206). Here, note that the wireless device 20 knows the BRS sequence ID for each measured BRS and includes the BRS sequence ID in the BRS-RP report. The BRS resource ID is encoded from the BRS sequence ID, symbol time, and BRS frequency resource k. As illustrated, the wireless device 20 sends a BRS-RP report to the LTE base station 16 via, in this example, the LTE PUSCH (step 206A). The LTE base station 16 sends the BRS-RP report to the new RAT base station 14-1 (e.g., via signaling over the core network 18) (step 206B).

Based on the BRS-RP report, the new RAT base station 14-1 identifies the time-frequency resource (i.e., value of k and OFDM symbol number in the example BRS patterns of FIGS. 2 and 3) that corresponds to the highest BRS-RP measurement value (step 208). In this example, there is no beam ambiguity and, as such, the identified time-frequency resource gives the BRS and, in turn, the BRS group (the BRS group ID is included in the BRS-RP report in association with the respective BRS-RP measurement value). However, in this example, the new RAT base stations 14-1 and 14-2 are assigned to the same BRS group (i.e., the new RAT base stations 14-1 and 14-2 transmit BRSs on the same BRS time-frequency resources with the same BRS sequence). Thus, there is an ambiguity with respect to the node ID of the new RAT base station 14-1 or 14-2 corresponding to the identified BRS group. In other words, there is an ambiguity as to which of the new RAT base stations 14-1 and 14-2 transmitted the beam for which the best BRS-RP measurement value was reported by the wireless device 20. As an example, the identified time-frequency resource may indicate that the "best" beam (i.e., the beam for which the highest BRS-RP measurement value was reported) is beam 22, but the new RAT base station 14-1 does not know whether this best beam was the beam 22 transmitted by the new RAT base station 14-1 or the beam 22 transmitted by the new RAT base station 14-2 since the two new RAT base stations 14-1 and 14-2 are assigned to the same BRS group.

The new RAT base station 14-1 forwards the BRS-RP report to all radio network nodes having been assigned the same BRS group as determined by the BRS group ID provided in the BRS-RP report (step 210). In this example, the new RAT base station 14-1 forwards the BRS-RP report to the new RAT base station 14-2 (step 212). Note that, in a scenario with tighter LTE-new RAT integration in the sense that LTE is able to decode new RAT control signaling, then this distribution could have been done already from the LTE network in step 206. In other words, step 212 may not be performed in some implementations.

The new RAT base stations 14-1 and 14-2 transmit respective messages on the beam corresponding to the best BRS-RP measurement in the BRS-RP report received from the wireless device 20, where the messages include the node IDs of the respective new RAT base stations 14-1 and 14-2 (steps 214 and 216). Thus, in steps 214 and 216, a (radio network) node ID is included in the messages and, as discussed below, thereafter mirrored back to the network. More specifically, in this example, the new RAT base station 14-1 transmits a DCI message including the node ID of the new RAT base station 14-1 on the identified beam (which in this example is beam 22) (step 214A). Likewise, the new RAT base station 14-2 transmits a DCI message including the node ID of the new RAT base station 14-2 on the identified beam (which in this example is beam 22) (step 216A).

The wireless device 20 receives the message from the new RAT base station 14-1 or 14-2 that corresponds to the "best" beam for the wireless device 20 and mirrors back the node ID contained in the message to the new RAT (e.g., to the new RAT base station 14-1 or to both of the new RAT base stations 14-1 and 14-2) (step 218). In this example, the "best" beam is beam 22 from the RAT base station 14-2. As such, the node ID of the new RAT base station 14-2 is included in the message received by the wireless device 20. In the illustrated example, the wireless device 20 mirrors the node ID of the new RAT base station 14-2 back to the new RAT via the LTE base station 16 in a new BRS-RP report (step 218A and step 218B); however, the present disclosure is not limited thereto. In this example, the new RAT base station 14-1 forwards the BRS-RP report to the new RAT base station 14-2 (step 218C). However, in some alternative embodiments, the LTE base station 16 provides the BRS-RP report to both the new RAT base station 14-1 and the new RAT base station 14-2.

Based on the node ID mirrored back from the wireless device 20, the new RAT base station 14-1 determines, or knows, that the best beam for the wireless device 20 (based on the BRS-RP report received in step 218B) is, in this example, beam 22 (or can be some other beam depending on the BRS-RP report) transmitted by the new RAT base station 14-2 (step 220). While not illustrated, in the same manner, the new RAT base station 14-2 may determine that the best beam for the wireless device is, in this example, beam 22 transmitted by the new RAT base station 14-2. Alternatively, the new RAT base station 14-1 may notify the new RAT base station 14-2 of the best beam. Steps 218 and 220 allow the network to identify which radio network node was the origin of the BRS that was received at the wireless device 20 and for which the highest BRS-RP measurement value was reported. Hence, subsequent transmissions can now be carried out using the best beam from the appropriate radio network node (step 222). For example, if the new RAT base station 14-1 was the origin of the best beam, then subsequent transmissions can now be carried out using the best beam from the new RAT base station 14-1. However, in this example, the new RAT base station 14-2 was the origin of the best beam and, as such, subsequent transmissions can now be carried out using the best beam from the new RAT base station 14-2.

Another alternative, which does not require the introduction of a radio network node identifier to be sent to the wireless device 20 and then mirrored back, as described above, would be to ensure that all the transmitted DCIs including the timing information in step 216 are all sent on unique occasions from each radio network node. By keeping track of the timing for when the transmission was made from each radio network node, then this timing information can be used then not only to resolve the beam identification timing ambiguity (as discussed above) but also the node identification problem. Note, however, that this assumes that the radio network nodes in the new RAT are possible to coordinate to that extension and/or that additional signaling/negotiation will need to be performed in between the radio network nodes of the new RAT to coordinate this.

An additional possibility (not depicted) would be for the wireless device, in step 218, also to include an identifier of the LTE cell (e.g., Physical Cell Identifier (PCID)) to which the wireless device 20 is connected in the LTE domain. This allows the network to even better determine the locality of the wireless device 20, and hence also make a reasonable assumption on which node that could be the correct one with respect to the BRS reporting.

Combination of Resolving Downlink Beam
Ambiguity and Radio Network Node Ambiguity The combination of the procedures described above with respect to FIGS. 5A through 5C and FIGS. 6A through 6C is straightforward and without the need for example. What happens is basically that in steps 108 and 110 of FIGS. 5A through 5C, both the timing information and node identifier are included.

In this regard, FIGS. 7A through 7E illustrate the operation of the cellular communications system 12 of FIG. 4, according to some embodiments of the present disclosure, to resolve both the downlink beam ambiguity and node ambiguity. In this example, there are two new RAT base stations 14-1 and 14-2, but there may be any number of new RAT base stations 14. As illustrated, the new RAT base station 14-1 transmits BRSs on multiple beams across multiple subframes according to a predefined BRS pattern, as discussed above (steps 300-1 through 300-N). Likewise, the new RAT base station 14-2 transmits BRSs on multiple beams across multiple subframes according to the predefined BRS pattern (steps 302-1 through 302-N). In this example, both of the new RAT base stations 14-1 and 14-2 are assigned the same BRS group.

The wireless device 20 receives one or more subframes containing BRSs transmitted by the new RAT base stations 14-1 and 14-2 (and potentially other new RAT base stations in the same or different BRS groups) and performs BRS-RP measurements on all beams (step 304). Note that the wireless device 20 does not know which beams those signals (i.e., the received BRSs) are transmitted on; the wireless device 20 only performs measurements on each time-frequency resource designated for BRS transmissions. The wireless device 20 reports the BRS-RP values (also referred to herein as BRS-RP measurement values) back to the new RAT via control signaling over an LTE network, the timing of which is unknown to the new RAT network (step 306). More specifically, as illustrated, the wireless device 20 sends a BRS-RP report to the LTE base station 16 via, in this example, the LTE PUSCH (step 306A). Notably, in this embodiment, the BRS-RP report may also include the BRS group ID. The LTE base station 16 sends the BRS-RP report to the new RAT base station (e.g., via signaling over the core network 18) (step 306B). In the illustrated example, the LTE base station 16 is shown as sending the BRS-RP report to the new RAT base station 14-1; however, the LTE base station 16 may alternatively send the BRS-RP report to the new RAT base station 14-2 or to both the new RAT base station 14-1 and the new RAT base station 14-2.

Based on the BRS-RP report, the new RAT base station 14-1 identifies the time-frequency resource (i.e., value of k and OFDM symbol number in the example BRS patterns of FIGS. 2 and 3) that corresponds to the highest BRS-RP measurement value (step 308). There is, however, an ambiguity with respect to the beam identity corresponding to the highest BRS-RP measurement value due to the timing issue (i.e., the wireless device 20 does not know whether the BRS-RP measurement was made in subframe n, n+m, n+2m, or n+3m in the examples of FIGS. 2 and 3). For instance, using the example BRS pattern of FIG. 3, if the time-frequency resource is OFDM symbol 7 and k=0, then there is ambiguity as to whether the best beam is beam 8, 22, 36, or 50. In other words, if the best beam is (unknown to the wireless device 20 and, at this point, the new RAT base stations 14-1 and 14-2) beam 22, then there is ambiguity at the new RAT base station 14-1 as to whether the identified time-frequency resource corresponding to the best BRS-RP measurement value is for beam 8, 22, 36, or 50.

In addition, based on the report, the new RAT base station 14-1 determines the potential BRS groups that correspond to the highest BRS-RP measurement value reported by the wireless device 20 (step 310). For instance, if the time-frequency resource for the highest BRS-RP measurement value corresponds to time-frequency resource k=0 and OFDM symbol number 7 in the example BRS pattern of FIG. 2, then the potential best beams are beams 8, 22, 36, and 50. In this example, both the new RAT base station 14-1 and the new RAT base station 14-2 are assigned to the same BRS group, which results in node ambiguity.

In this example, since there is node ambiguity with respect to the BRS group of the new RAT base stations 14-1 and 14-2, the new RAT base station 14-1 forwards the BRS-RP report to the new RAT base station 14-2 (step 312 and 312A). Note that, in a scenario with tighter LTE-new RAT integration in the sense that LTE is able to decode new RAT control signaling, then this distribution could have been done already from the LTE network in step 306.

The new RAT base stations 14-1 and 14-2 transmit respective messages on all beams corresponding to the time-frequency resource of the best BRS-RP measurement in the BRS-RP report received from the wireless device 20, where the messages include both timing information and the node IDs of the respective new RAT base stations 14-1 and 14-2 (steps 314 and 316). More specifically, in this example, the new RAT base station 14-1 transmits DCI messages including the timing information and the node ID of the new RAT base station 14-1 on beams 8, 22, 36, and 50 (steps 314-1 through 314-4). Likewise, the new RAT base station 14-2 transmits DCI messages including the timing information and the node ID of the new RAT base station 14-2 on beams 8, 22, 36, and 50 (steps 318-1 through 318-4).

The wireless device 20 receives the message on the best beam from the best new RAT base station 14-1 or 14-2 and, in this example, sends a new BRS-RP report to the new RAT network that includes the node ID from the received message (i.e., the node ID of the best new RAT base station 14-1 or 14-2) and timing information for the measurements that is based on the timing information in the received message (step 320). In this particular embodiment, the wireless device 20 sends a new BRS-RP report to the new RAT base station via the LTE base station 16 (steps 320A and 320B). In the illustrated example, the LTE base station 16 is shown as sending the BRS-RP report to the new RAT base station 14-1; however, the LTE base station 16 may alternatively send the BRS-RP report to the new RAT base station 14-2 or to both the new RAT base station 14-1 and the new RAT base station 14-2. In this example, the new RAT base station 14-1 forwards the BRS-RP report to the new RAT base station 14-2 (step 320C). However, in some alternative embodiments, the LTE base station 16 provides the BRS-RP report to both the new RAT base station 14-1 and the new RAT base station 14-2. The new BRS-RP report includes timing information for each BRS-RP measurement value that is based on the timing information comprised in the received message as well as the node ID comprised in the received message.

The new RAT base station 14-1 then determines the best beam and the best new RAT base station 14 for downlink transmission to the wireless device 20 based on the timing information and the node ID received from the wireless device 20 (step 322). While not illustrated, in the same manner, the new RAT base station 14-2 may determine that the best beam for the wireless device 20 is, in this example, the beam 22 transmitted by the new RAT base station 14-2. Alternatively, the new RAT base station 14-1 may notify the new RAT base station 14-2 of the best beam. Subsequently, DCI transmissions are made to the wireless device 20 using the best beam from the best new RAT base station 14, as described above (step 324).

As indicated by the foregoing, in certain embodiments, a timing uncertainty that results when the control signaling for the new 5G RAT is run on top of LTE in a dual-connectivity mode is resolved. This is achieved by transmitting timing information on all downlink beams that have been indicated as candidates for being the "best" beam in the BRS-RP report from the wireless device 20. This timing information is included in the new BRS-RP report to the radio network node which enables it to resolve the ambiguity and thus determine the best downlink beam.

In a situation where the BRS-RP reporting results in an ambiguity as to which node actually transmitted the BRS that the wireless device 20 measured on, the solution is, in some embodiments, to transmit either using refinements of the above procedure or to introduce a radio network node identifier which is then echoed back to the node. This enables the network to resolve this ambiguity.

The described embodiments may be implemented in any appropriate type of communications system supporting any suitable communication standards and using any suitable components. As one example, certain embodiments may be implemented in an LTE network.

Figure 8:
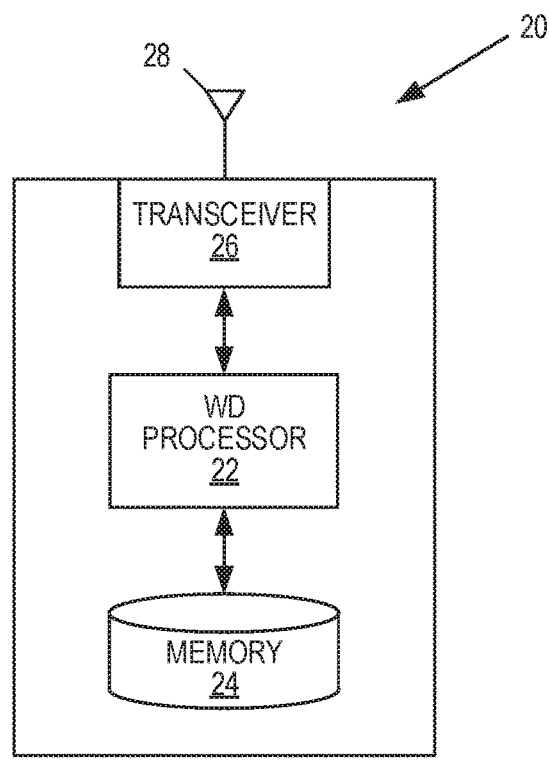
FIGS. 8 and 9 are block diagrams of example embodiments of a new RAT base station according to some embodiments of the present disclosure.
Figure 9:
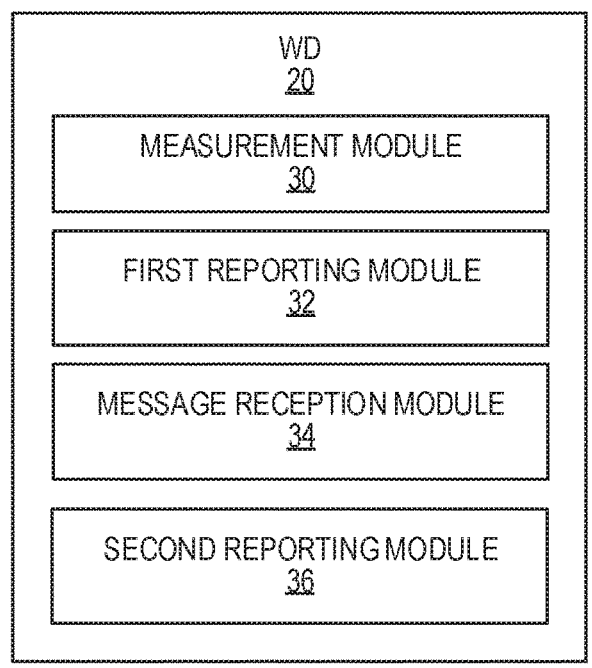

Although the wireless device 20 (also referred to as a wireless communication device) may represent communication devices that include any suitable combination of hardware and/or software, the wireless device 20 may, in certain embodiments, represent devices such as an example wireless device 20 illustrated in greater detail by FIGS. 8 and 9. Similarly, although the illustrated new RAT base station 14 (and likewise the new RAT base stations 14-1 and 14-2), which is also referred to herein more generally as a radio access node, may represent a network node that includes any suitable combination of hardware and/or software, this node may, in particular embodiments, represent a device such as the example base station 14, or radio access node, illustrated in greater detail by FIGS. 10 and 11. Similarly, although the illustrated LTE base station 16, which is also referred to herein more generally as a radio access node, may represent a network node that includes any suitable combination of hardware and/or software, this node may, in particular embodiments, represent a device such as the example base station 16, or radio access node, illustrated in greater detail by FIGS. 12 and 13.

Referring to FIG. 8, the wireless device 20 comprises a processor 22, memory 24, a transceiver 26, and an antenna 28. The processor 22 may include one or more processing circuits such as, for example, one or more Central Processing Units (CPUs), one or more Application-Specific Integrated Circuits (ASICs), one or more Field-Programmable Gate Arrays (FPGAs), and/or the like, or any combination thereof. In certain embodiments, some or all of the functionality described as being provided by the wireless device 20 may be provided by the processor 22 executing instructions stored on a computer-readable medium, such as the memory 24 shown in FIG. 8. Alternative embodiments may include additional components beyond those shown in FIG. 8 that may be responsible for providing certain aspects of the device's functionality, including any of the functionality described herein.

In some embodiments, a computer program including instructions which, when executed by at least one processor, causes the at least one processor to carry out the functionality of the wireless device 20 according to any of the embodiments described herein is provided. In some embodiments, a carrier containing the aforementioned computer program product is provided. The carrier is one of an electronic signal, an optical signal, a radio signal, or a computer-readable storage medium (e.g., a non-transitory computer-readable medium such as the memory 24).

FIG. 9 illustrates another example embodiment of the wireless device 20. In this embodiment, the wireless device 20 includes a measurement module 30, a first reporting module 32, a message-reception module 34, and a second reporting module 36, each of which is implemented in software. The measurement module 30 operates to receive (via a transceiver of the wireless device 20, which is not shown) one or more subframes for a first RAN (e.g., the new RAT network), the one or more subframes containing BRSs in a predefined BRS pattern and perform BRS-RP measurements, using the BRSs, on time-frequency resources assigned to beams via the predefined BRS pattern, as described in detail above. The first reporting module 32 operates to send (via an associated transceiver of the wireless device 20, which is not shown) a first BRS-RP report to a first base station (e.g., the new RAT base station 14) of the first RAN via a second base station (e.g., the LTE base station 16) of a second RAN, where the BRS-RP report includes BRS-RP measurement values for at least some of the time-frequency resources assigned to the BRSs, as described in detail above. The message reception module 34 operates to receive (via an associated transceiver of the wireless device 20, which is not shown), from the first RAN, a message comprising: (a) timing information for the first base station and/or (b) and a node identifier of a base station from which the message was transmitted, as described in detail above. The second reporting module 36 operates to send (using a transceiver of the wireless device 20, which is not shown), via the second base station of the second RAN, a second BRS-RP report including one or more second BRS-RP measurement values and: (a) timing information for the one or more second BRS-measurement values that is based on the timing information for the first base station and/or (b) the node identifier of the base station from which the message was transmitted, as described in detail above.

Figure 10:
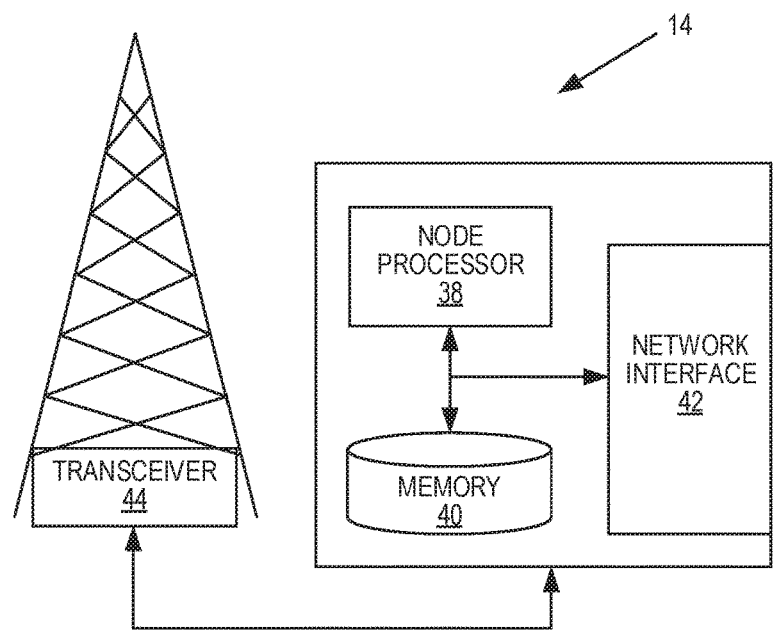
FIGS. 10 and 11 are block diagrams of example embodiments of an assist RAT base station according to some embodiments of the present disclosure.

Referring to FIG. 10, the new RAT base station 14, or radio access node, includes a node processor 38, memory 40, a network interface 42, and a transceiver 44 coupled to multiple antennas. The node processor 38 may include one or more processing circuits such as, for example, one or more CPUs, one or more ASICs, one or more FPGAs, and/or the like, or any combination thereof. In certain embodiments, some or all of the functionality described as being provided by the new RAT base station 14 (or new RAT base station 14-1 or 14-2) may be provided by the node processor 38 executing instructions stored on a computer-readable medium, such as the memory 40 shown in FIG. 10. Alternative embodiments of new RAT base station 14 may comprise additional components to provide additional functionality, such as the functionality described herein and/or related supporting functionality.

In some embodiments, a computer program including instructions which, when executed by at least one processor, causes the at least one processor to carry out the functionality of the new RAT base station 14 (or new RAT base station 14-1 or 14-2) according to any of the embodiments described herein is provided. In some embodiments, a carrier containing the aforementioned computer program product is provided. The carrier is one of an electronic signal, an optical signal, a radio signal, or a computer-readable storage medium (e.g., a non-transitory computer-readable medium such as the memory 40).

Figure 11:
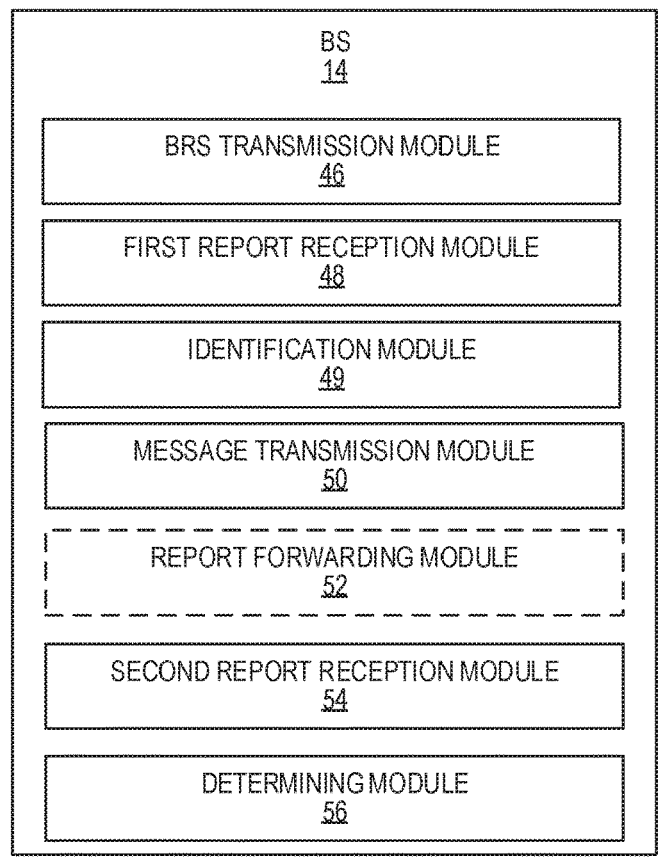

FIG. 11 illustrates another example embodiment of the new RAT base station 14 (or new RAT base station 14-1). In this embodiment, the new RAT base station 14 includes a BRS transmission module 46, a first report-reception module 48, an identification module 49, a message-transmission module 50, (optionally) a report-forwarding module 52, a second report-reception module 54, and a determining module 56, each of which is implemented in software. The BRS transmission module 46 operates to transmit (via an associated transceiver of the new RAT base station 14, which is not shown) BRSs, as described in detail above. The first report-reception module 48 operates to receive (via an associated network interface or, alternatively, via a transceiver of the new RAT base station 14, which are not shown) a first BRS-RP report from the wireless device 20, as described in detail above. The identification module 49 operates to identify the time-frequency resource that corresponds to the best BRS-RP measurement in the received BRS-RP report. The message-transmission module 50 operates to transmit separate messages to the wireless device 20 on a number of potential best beams (based on the first BRS-RP report), where the messages include timing information and/or a node ID of the new RAT base station 14, as described in detail above. In some embodiments, the report-forwarding module 52 operates to forward (via an associated network interface of the new RAT base station 14, which is not shown) the first BRS-RP report to one or more additional new RAT base stations, as described in detail above. The second report-reception module 54 operates to receive (via an associated network interface or, alternatively, via a transceiver of the new RAT base station 14, which are not shown) a second BRS-RP report from the wireless device 20, as described in detail above. The determining module 56 determines a best beam for transmission to the wireless device 20 by resolving timing and/or node ambiguity based on the timing information and/or node ID included in the second BRS-RP report, as described in detail above.

Figure 12:
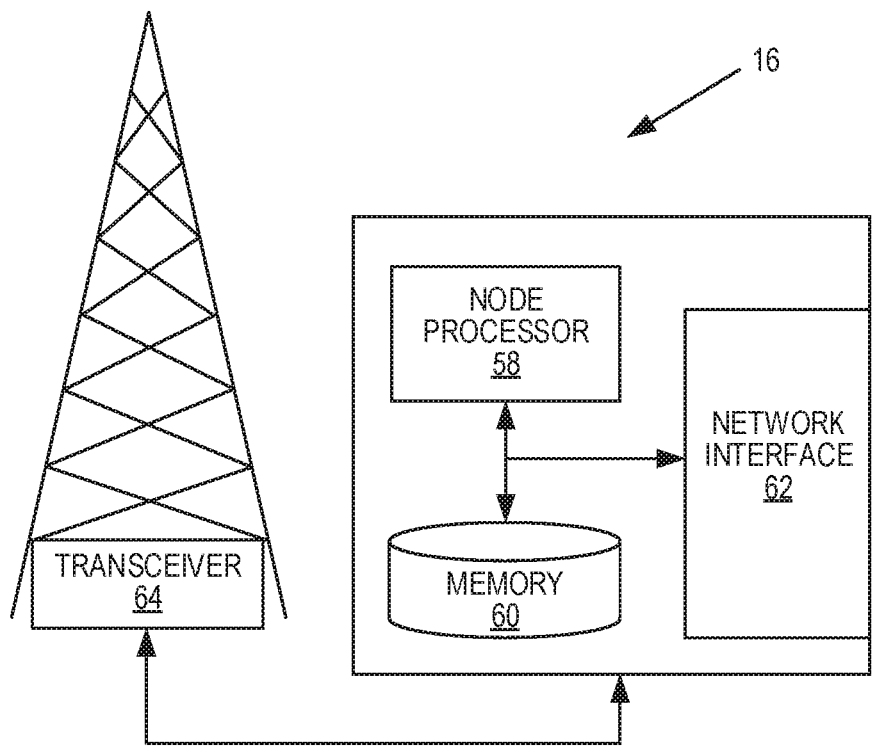
FIGS. 12 and 13 are block diagrams of example embodiments of a wireless device according to some embodiments of the present disclosure.

Referring to FIG. 12, the LTE base station 16, or radio access node, includes a node processor 58, memory 60, a network interface 62, and a transceiver 64 coupled to one or more antennas. The node processor 58 may include one or more processing circuits such as, for example, one or more CPUs, one or more ASICs, one or more FPGAs, and/or the like, or any combination thereof. In certain embodiments, some or all of the functionality described as being provided by the LTE base station 16 may be provided by the node processor 58 executing instructions stored on a computer-readable medium, such as the memory 60 shown in FIG. 12.

Alternative embodiments of the LTE base station 16 may comprise additional components to provide additional functionality, such as the functionality described herein and/or related supporting functionality.

In some embodiments, a computer program including instructions which, when executed by at least one processor, causes the at least one processor to carry out the functionality of the LTE base station 16 according to any of the embodiments described herein is provided. In some embodiments, a carrier containing the aforementioned computer program product is provided. The carrier is one of an electronic signal, an optical signal, a radio signal, or a computer-readable storage medium (e.g., a non-transitory computer-readable medium such as the memory 60).

Figure 13:
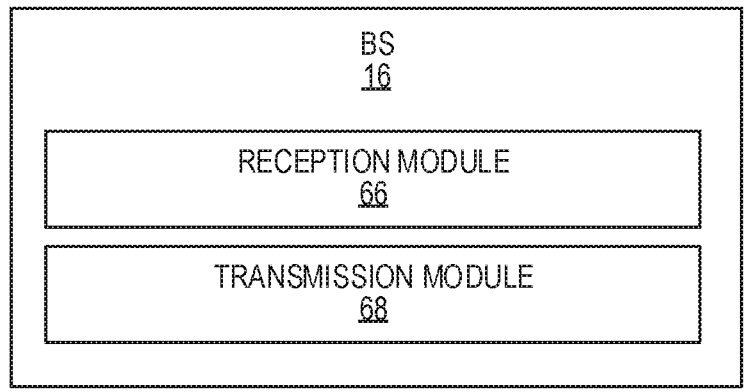

FIG. 13 illustrates another example embodiment of the LTE base station 16. In this embodiment, the LTE base station 16 includes a reception module 66 and a transmission module 68, each of which is implemented in software. The reception module 66 operates to receive (via an associated transceiver of the LTE base station 16, which is not shown) control signaling (e.g., BRS-RP reports) from the wireless device 20. The transmission module 68 operates to transmit, or send, the received control signaling (e.g., BRS-RP reports) received from the wireless device 20 to the new RAT base station 14 (e.g., via a network interface of the LTE base station 16, which is not shown).

While the disclosed subject matter has been presented above with reference to various embodiments, it will be understood that various changes in form and details may be made to the described embodiments without departing from the overall scope of the disclosed subject matter.

The following acronyms are used throughout this disclosure.

| | |
|---|---|
| 3GPP | Third-Generation Partnership Project |
| 5G | Fifth Generation |
| ASIC | Application-Specific Integrated Circuit |
| BRS | Beam Reference Symbol |
| BRS-RP | Beam Reference Symbol Received Power |
| CPU | Central Processing Unit |
| DCI | Downlink Control Information |
| eNB | Enhanced or Evolved Node B |
| FPGA | Field-Programmable Gate Array |
| ID | Identity |
| LTE | Long-Term Evolution |
| MTC | Machine-to-Machine |
| OFDM | Orthogonal Frequency-Division Multiplexing |
| PCID | Physical Cell Identifier |
| PDSCH | Physical Downlink Shared Channel |
| PUSCH | Physical Uplink Shared Channel |
| PRB | Physical Resource Block |
| RAN | Radio-Access Network |
| RAT | Radio-Access Technology |
| SFN | System Frame Number |
| SSS | Secondary Synchronization Signal |
| TA | Timing Advance |
| TDD | Time-Division Duplexing |
| Tx | Transmit |
| UE | User Equipment |

Those skilled in the art will recognize improvements and modifications to the embodiments of the present disclosure. All such improvements and modifications are considered within the scope of the concepts disclosed herein and the claims that follow.

What is claimed is:

1. A method of operation of a first base station of a first radio access network of a cellular communications system, the first base station utilizing beamforming to transmit a plurality of beams, comprising:

identifying, based on a Beam Reference Symbol Received Power (BRS-RP) report received from a wireless device via a second base station of a second radio access network of the cellular communications system, a time-frequency resource that corresponds to a best BRS-RP measurement value from among one or more BRS-RP measurement values reported by the wireless device in the BRS-RP report, where the identified time-frequency resource maps, via a predefined Beam Reference Symbol (BRS) pattern, to two or more beams in two or more subframes;

transmitting, to the wireless device, messages comprising timing information on the two or more beams;

receiving a second BRS-RP report from the wireless device, the second BRS-RP report comprising one or more BRS-RP measurement values for one or more time-frequency resources and corresponding timing information for the BRS-RP measurements that is based on the timing information comprised in one of the messages transmitted on the two or more beams that was received by the wireless device; and determining, based on the second BRS-RP report and the timing information comprised in the second BRS-RP report, that a beam that corresponds to a best BRS-RP measurement value reported by the wireless device in the second BRS-RP report is a best beam for transmission from the first base station to the wireless device.

2. The method of claim 1 wherein the second radio access network operates according to a different radio access technology than the first radio access network.

3. The method of claim 1 wherein the first radio access network is a Fifth Generation, 5G, radio access network, and the second radio access network is a Long Term Evolution, LTE, radio access network.

4. The method of claim 1 further comprising transmitting subsequent messages scheduling downlink or uplink transmission for the wireless device on the beam that corresponds to the best BRS-RP measurement value reported by the wireless device in the second BRS-RP report.

5. The method of claim 1 wherein the timing information comprises a current System Frame Number, SFN, of the first base station.

6. The method of claim 1 wherein the identified time-frequency resource is a particular symbol position in the time domain.

7. The method of claim 1 wherein the identified time-frequency resource is a particular symbol position in the time domain within a particular group of physical resource blocks in the frequency domain.

8. The method of claim 1 further comprising:
forwarding the BRS-RP report to one or more additional base stations of the first radio access network, the one or more additional base stations being base stations that are assigned to the same BRS group as the first base station;
wherein:
transmitting the messages comprises transmitting the messages comprising the timing information and a node identifier of the first base station on the two or more beams, where respective messages are also transmitted by each of the one or more additional base stations; and
receiving the second BRS-RP report comprises receiving the second BRS-RP report from the wireless device, the second BRS-RP report comprising:
the one or more BRS-RP measurement values for the one or more time-frequency resources and the corresponding timing information for the BRS-RP measurements that is based on the timing information comprised in the one of the messages transmitted on the two or more beams that was received by the wireless device; and the node identifier comprised in the one of the messages transmitted on the two or more beams that was received by the wireless device.

9. The method of claim 8 further comprising:
wherein determining the beam that corresponds to the best BRS-RP measurement value reported by the wireless device in the second BRS-RP report comprises, if the second BRS-RP report comprises the node identifier of the first base station, determining, based on the second BRS-RP report, that the beam that corresponds to the best BRS-RP measurement value reported by the wireless device in the second BRS-RP report is the best beam for transmission to the wireless device.

10. A base station of a first radio access network of a cellular communications system, the base station utilizing beamforming to transmit a plurality of beams, comprising:
a network interface;
a transceiver;
a node processor comprising one or more processing circuits; and
memory storing instructions executable by the node processor whereby the base station is adapted to:
identify, based on a Beam Reference Symbol Received Power (BRS-RP) report received from a wireless device via a second base station of a second radio access network of the cellular communications system, a time-frequency resource that corresponds to a best BRS-RP measurement value from among one or more BRS-RP measurement values reported by the wireless device in the BRS-RP report, where the identified time-frequency resource maps, via a predefined Beam Reference Symbol (BRS) pattern, to two or more beams in two or more subframes;
transmit, via the transceiver, messages comprising timing information on the two or more beams;
receive a second BRS-RP report from the wireless device, the second BRS-RP comprising one or more BRS-RP measurement values for one or more time-frequency resources and corresponding timing information for the BRS-RP measurements that is based on the timing information comprised in one of the messages transmitted on the two or more beams that was received by the wireless device; and
determine, based on the second BRS-RP report and the timing information comprised in the second BRS-RP report, that a beam that corresponds to a best BRS-RP measurement value reported by the wireless device in the second BRS-RP report is a best beam for transmission from the base station to the wireless device.

11. A method of operation of a wireless device in a cellular communications system, comprising:
receiving one or more subframes for a first radio access network, the one or more subframes containing Beam Reference Symbols (BRSs) in a predefined BRS pattern;
performing BRS Received Power (BRS-RP) measurements, using the BRSs, on time-frequency resources assigned to a plurality of beams via the predefined BRS pattern, the predefined BRS pattern being such that, for a time-frequency resource, BRSs for different beams are transmitted on the time-frequency resource in different subframes;
sending a BRS-RP report to a first base station of the first radio access network via a second base station of a second radio access network, the BRS-RP report comprising BRS-RP measurement values for at least some of the time-frequency resources assigned to the BRSs;
after sending the BRS-RP report, receiving, from the first radio access network, a message comprising at least one of a group consisting of: timing information for the first base station and a node identifier of one of a plurality of base stations included in the first radio access nodes, wherein the plurality of base stations includes the first base station and the node identifier identifies the one of the plurality of base stations from which the message was transmitted; and
sending a second BRS-RP report comprising one or more second BRS-RP measurement values and at least one of the group consisting of: timing information for the one or more second BRS measurement values that is based on the timing information for the first base station and the node identifier.

12. The method of claim 11 wherein:
receiving the message comprises receiving, from the first base station of the first radio access network, the message comprising the timing information for the first base station; and
sending the second BRS-RP report comprises sending the second BRS-RP report comprising the one or more second BRS-RP measurement values and timing information for the one or more second BRS-RP measurement values that is based on the timing information for the first base station.

13. The method of claim 11 wherein:
receiving the message comprises receiving, from the first radio access network, the message comprising the node identifier; and
sending the second BRS-RP report comprises sending the second BRS-RP report comprising the one or more second BRS-RP measurement values and the node identifier.

14. A wireless device enabled to operate in a cellular communications system, comprising:
a transceiver;
a processor comprising one or more processing circuits; and
memory storing instructions executable by the processor whereby the wireless device is adapted to:
receive, via the transceiver, one or more subframes for a first radio access network, the one or more subframes containing Beam Reference Symbols, BRSs, in a predefined BRS pattern and perform BRS Received Power, BRS-RP, measurements, using the BRSs, on time-frequency resources assigned to a plurality of beams via the predefined BRS pattern, the predefined BRS pattern being such that, for a time-frequency resource, BRSs for different beams are transmitted on the time-frequency resource in different subframes;
send, via the transceiver, a BRS-RP report to a first base station of the first radio access network via a second base station of a second radio access network, the BRS-RP report comprising BRS-RP measurement values for at least some of the time-frequency resources assigned to the BRSs;

receive, from the first radio access network via the transceiver, a message comprising at least one of a group consisting of: timing information for the first base station and a node identifier of a base station from which the message was transmitted; and send, via the transceiver, a second BRS-RP report comprising one or more second BRS-RP measurement values and at least one of the group consisting of: timing information for the one or more second BRS-measurement values that is based on the timing information for the first base station and the node identifier of the base station from which the message was transmitted.

* * * * *